(12) United States Patent
Turner

(10) Patent No.: US 7,992,226 B2
(45) Date of Patent: Aug. 9, 2011

(54) PAD ELEMENTS FOR APPAREL AND OTHER PRODUCTS

(75) Inventor: David Turner, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 421 days.

(21) Appl. No.: 12/048,854

(22) Filed: Mar. 14, 2008

(65) Prior Publication Data

US 2009/0233511 A1 Sep. 17, 2009

(51) Int. Cl.
*A41D 13/00* (2006.01)
(52) U.S. Cl. .......... 2/267; 2/22; 2/23; 2/24; 2/62; 2/455; 2/456; 2/459; 442/221; 442/224; 442/315; 442/370; 442/373
(58) Field of Classification Search .................. 442/221, 442/224, 315, 370, 373; 2/22, 23, 24, 62, 2/267, 455, 456, 459
See application file for complete search history.

(56) References Cited

U.S. PATENT DOCUMENTS

| 5,689,836 | A | 11/1997 | Fee et al. |
| 5,797,865 | A | 8/1998 | McDavid, III |
| 5,920,915 | A * | 7/1999 | Bainbridge et al. ............ 2/456 |
| 6,032,300 | A * | 3/2000 | Bainbridge et al. ............ 2/456 |
| 6,507,955 | B1 | 1/2003 | Fee et al. |
| 7,168,104 | B2 * | 1/2007 | Tobergte ........................ 2/459 |

OTHER PUBLICATIONS

Definition "aperture" http://www.merriam-webster.com/dictionary/aperture, Merriam-Webster Online Dictionary copyright 2010 (no month).*
"HexPad Levels" Page from McDavid USA Web Site (www.mcdavidusa.com), downloaded May 21, 2008.
"#6515 Hex Impact Pad" Page from McDavid USA Web Site (www.mcdavidusa.com), downloaded May 21, 2008.

* cited by examiner

*Primary Examiner* — Andrew T Piziali
(74) *Attorney, Agent, or Firm* — Plumsea Law Group, LLC

(57) ABSTRACT

A pad element may include a base member, a pair of cover layers, and a plurality of beads. The base member defines a plurality of apertures. The cover layers are secured to opposite surfaces of the base member and extend across the apertures. The beads are located within the apertures and between the cover layers. As examples, the base member and the beads may be formed from polymer foam materials, and the cover layers may be formed from textile materials. The pad element may be utilized to attenuate impact forces and provide one or more of breathability, flexibility, a relatively low overall mass, and launderability.

24 Claims, 24 Drawing Sheets

PAD ELEMENTS FOR APPAREL AND OTHER PRODUCTS

BACKGROUND

Materials or elements that impart padding or cushioning (i.e., attenuate impact forces) are commonly incorporated into a variety of products. Athletic apparel, for example, often incorporates pads that protect the wearer from contact with other athletes, equipment, or the ground. More specifically, pads used in American football and hockey provide impact protection to various parts of a wearer. Helmets utilized during bicycling, skiing, snowboarding, and skateboarding incorporate pads that provide head protection during falls or crashes. Similarly, gloves utilized in soccer (e.g., by goalies) and hockey incorporate pads that provide protection to the hands of a wearer. In addition to apparel, mats (e.g., for yoga or camping), chair cushions, and backpacks all incorporate pads to enhance comfort.

SUMMARY

A pad element may include a base member, a first cover layer, a second cover layer, and a plurality of beads. The base member has a first surface, an opposite second surface, and a plurality of apertures extending from the first surface to the second surface. The first cover layer is secured to the first surface of the base member and extends across portions of the apertures positioned adjacent to the first surface. The second cover layer is secured to the second surface of the base member and extends across portions of the apertures positioned adjacent to the second surface. The beads are located within the apertures and between the first cover layer and the second cover layer. As examples, the base member and the beads may be formed from polymer foam materials, and the cover layers may be formed from textile materials.

The advantages and features of novelty characterizing aspects of the invention are pointed out with particularity in the appended claims. To gain an improved understanding of the advantages and features of novelty, however, reference may be made to the following descriptive matter and accompanying figures that describe and illustrate various configurations and concepts related to the invention.

FIGURE DESCRIPTIONS

The foregoing Summary and the following Detailed Description will be better understood when read in conjunction with the accompanying figures.

DETAILED DESCRIPTION

Figure 1:
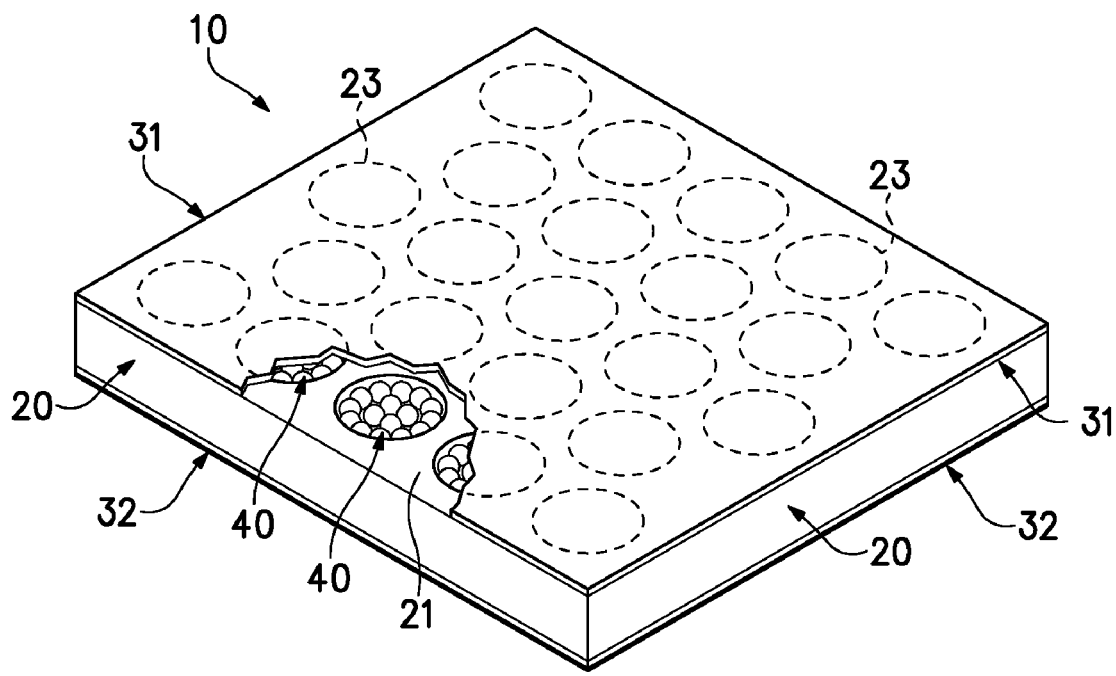
FIG. 1 is a perspective view of a pad element.
Figure 2:
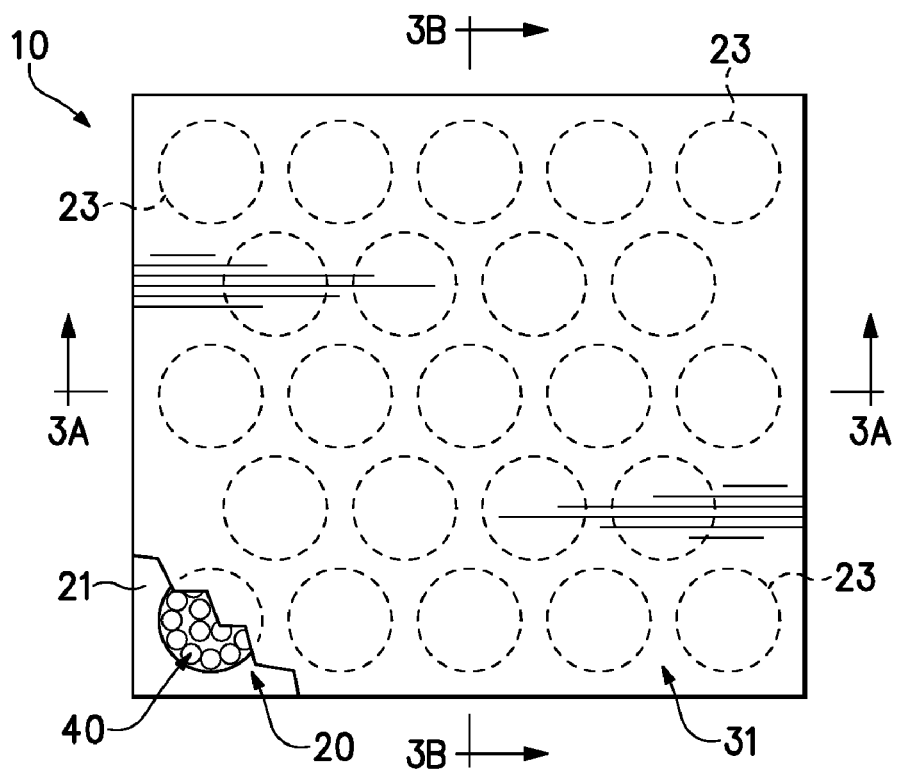
FIG. 2 is a top plan view of the pad element.

The following discussion and accompanying figures disclose various configurations of a pad element 10 that may be incorporated into a variety of products, including articles of apparel, mats, seat cushions, and backpacks, for example.

General Pad Element Configuration

With reference to FIGS. 1-4, pad element 10 is depicted as including a base member 20, a pair of cover layers 31 and 32, and a plurality of beads 40. Base member 20 has a first surface 21, an opposite second surface 22, and a plurality of apertures 23 that extend through base member 20 and between surfaces 21 and 22. Cover layer 31 is secured to first surface 21 and extends across portions of apertures 23 positioned adjacent to first surface 21. Similarly, cover layer 32 is secured to second surface 22 and extends across portions of apertures 23 positioned adjacent to second surface 22. Beads 40 are located within apertures 23 and between cover layers 31 and 32.

A variety of materials may be utilized for the various components of pad element 10. Base member 20 may be formed from generally compressible materials, such as polymer foam materials, that return to an original shape after being compressed. Examples of suitable polymer foam materials for base member 20 include polyurethane, ethylvinylacetate, polyester, polypropylene, and polyethylene foams. Cover layers 31 and 32 may be formed from knitted, woven, or non-woven textile elements that include rayon, nylon, polyester, polyacrylic, cotton, wool, or silk, for example. In some configurations of pad element 10, one or both of cover layers 31 and 32 may be formed from a polymer sheet. Beads 40 are a plurality of discrete, relatively small elements (e.g., spherically-shaped or generally spherically-shaped) that may also be formed from generally compressible materials, such as the polymer foam materials discussed above for base member 20. In some configurations of pad element 10, beads 40 may be formed from foam beads manufactured by BROCK USA of Boulder, Colo., United States of America.

Figure 3A:
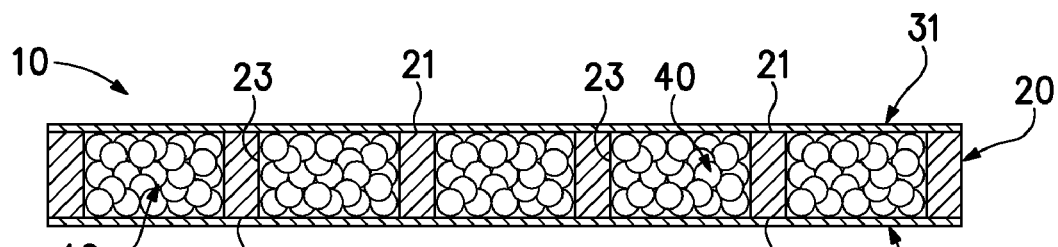
FIGS. 3A and 3B are cross-sectional views of the pad element, as defined by section lines 3A and 3B in FIG. 2.
Figure 3B:
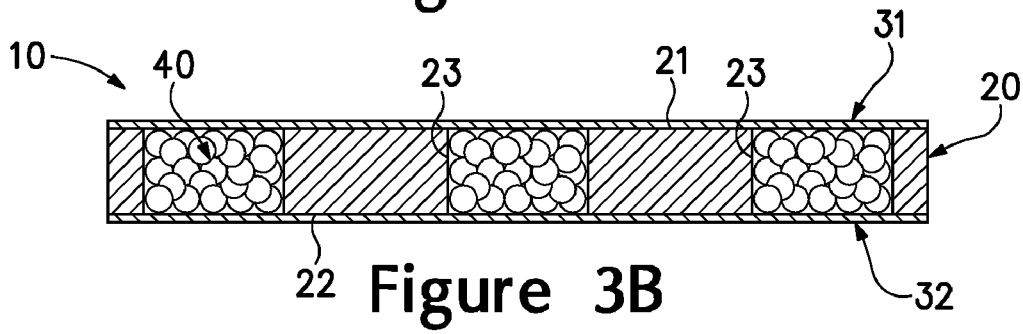
Figure 3C:
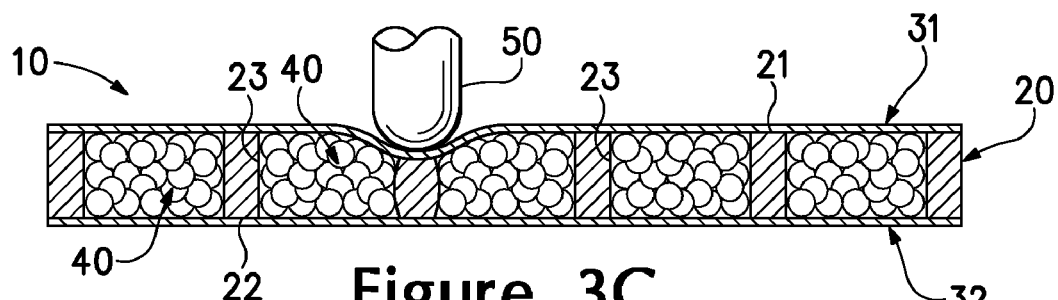
FIGS. 3C-3E are cross-sectional views corresponding with FIG. 3A and depicting the pad element in compressed states.
Figure 3D:
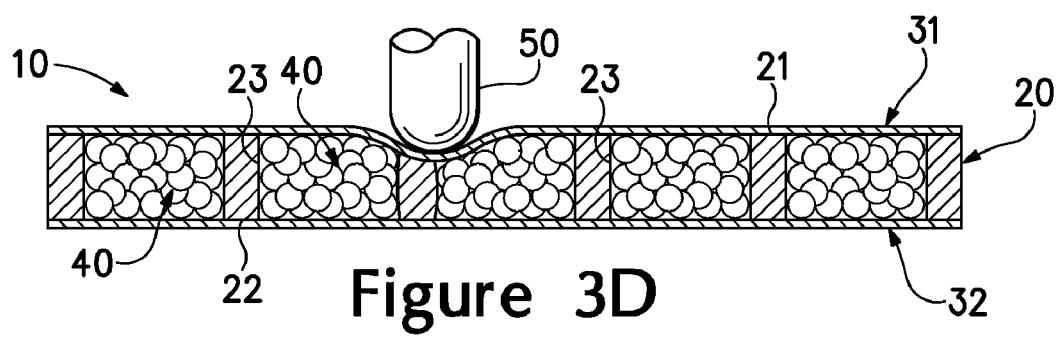
Figure 3E:
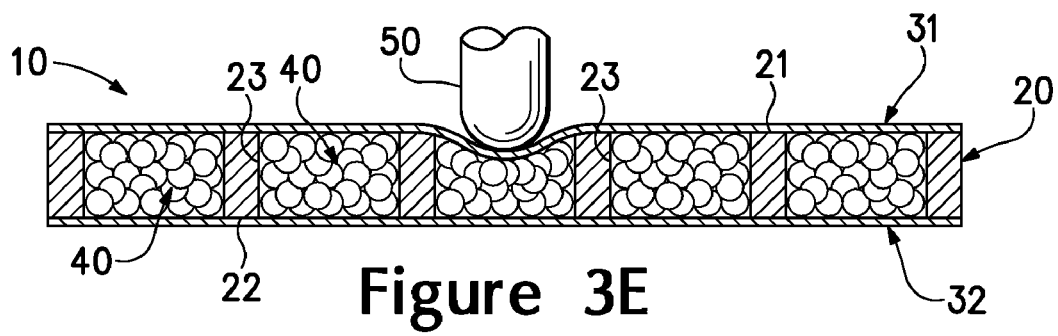
Figure 4:
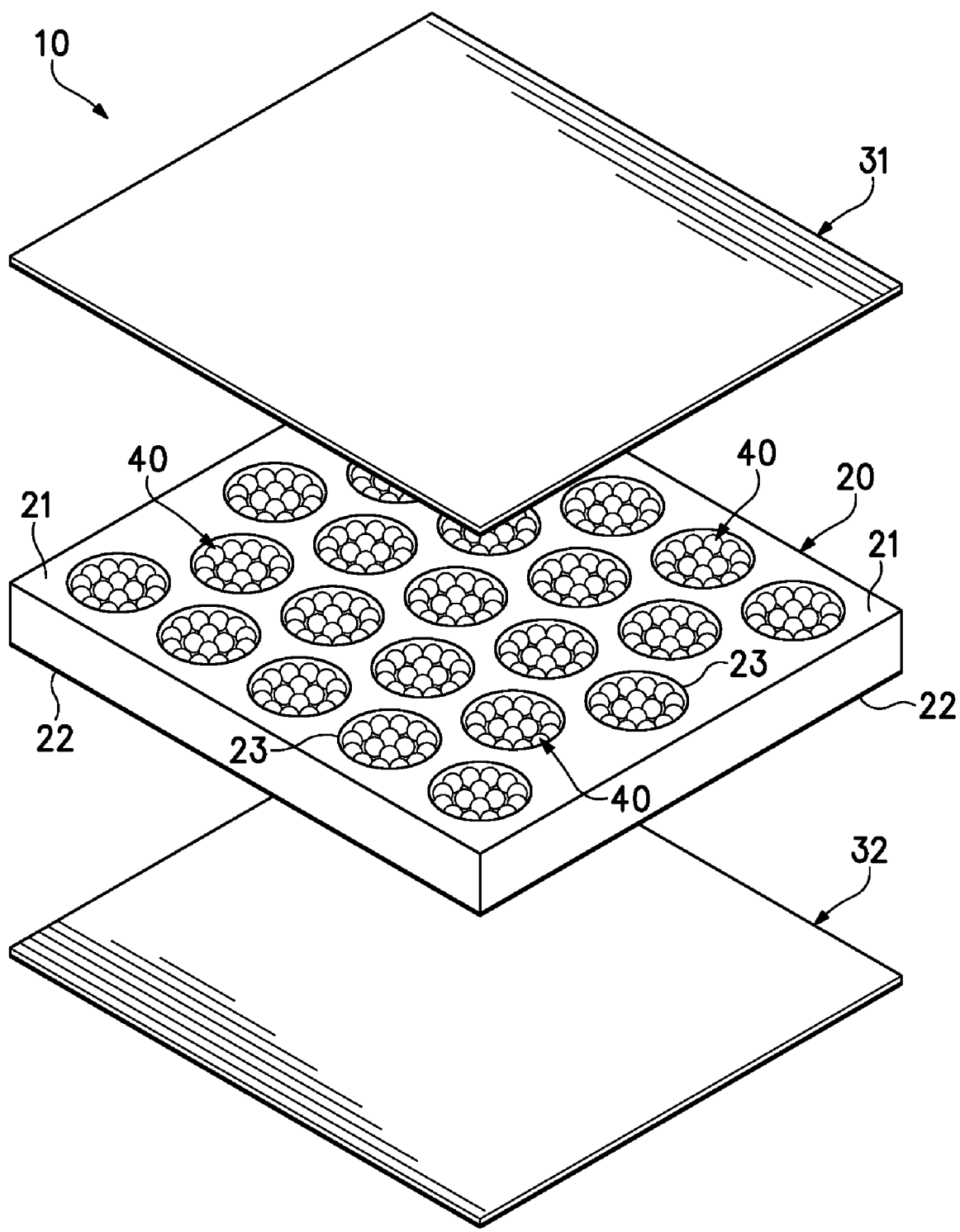
FIG. 4 is an exploded perspective view of the pad element.

The compressible polymer foam materials forming base element 20 and beads 40 attenuate impact forces that compress or otherwise contact pad 10. When incorporated into an article of apparel, for example, the polymer foam materials of base member 20 and beads 40 may compress to protect a wearer from contact with other athletes, equipment, or the ground. Accordingly, pad element 10 may be utilized to provide cushioning or protection to areas of a wearer that are covered by pad element 10. Referring to FIGS. 3C-3E, an object 50 is depicted as impacting various portions of pad element 10. Given the configuration of pad element 10, particularly with regard to base member 20 and beads 40, object 50 may not project through pad element 10 regardless of the area of contact with pad element 10. More particularly, when object 50 contacts a portion of pad element 10 primarily formed by base member 20 (i.e., between two apertures 23), as depicted in FIG. 3C, base member 20 compresses to attenuate impact forces and provide cushioning or protection. When object 50 contacts a portion of pad element 10 primarily formed by both base member 20 and beads 40 (i.e., at an edge of one of apertures 23), as depicted in FIG. 3D, base member 20 and beads 40 cooperatively compresses to attenuate impact forces and provide cushioning or protection. Similarly, when object 50 contacts a portion of pad element 10 primarily formed by beads 40 (i.e., at a center of one of apertures 23), as depicted in FIG. 3E, beads 40 compresses to attenuate impact forces and provide cushioning or protection. Accordingly, regardless of the area at which an object contacts pad element 10, pad element 10 attenuates impact forces associated with the contact.

In addition to attenuating impact forces, pad element 10 has an advantage of simultaneously providing one or more of breathability, flexibility, a relatively low overall mass, and launderability. When incorporated into an article of apparel, particularly apparel used for athletic activities, a wearer may perspire and generate excess heat. By (a) forming apertures 23 in base member 20, (b) utilizing a permeable textile material for cover layers 31 and 32, and (c) locating beads 40 within apertures 23, areas for air to enter the apparel and for moisture to exit the apparel are formed through pad element 10. More particularly, air and moisture may pass through cover layers 31 and 32, through apertures 23, and around beads 40 to impart breathability to areas of the apparel having pad element 10. Moreover, the materials discussed above for the components of pad element 10 impart flexibility and a low overall mass to pad 10. Furthermore, the presence of apertures 23 and the configuration of beads 40 permits pad element 10 to be laundered without significant shrinkage or warping, even when temperatures associated with commercial laundering processes are utilized. Accordingly, pad element 10 may simultaneously provide impact force attenuation, breathability, flexibility, a relatively low overall mass, and launderability to an article of apparel.

Manufacturing Processes

Figure 5A:
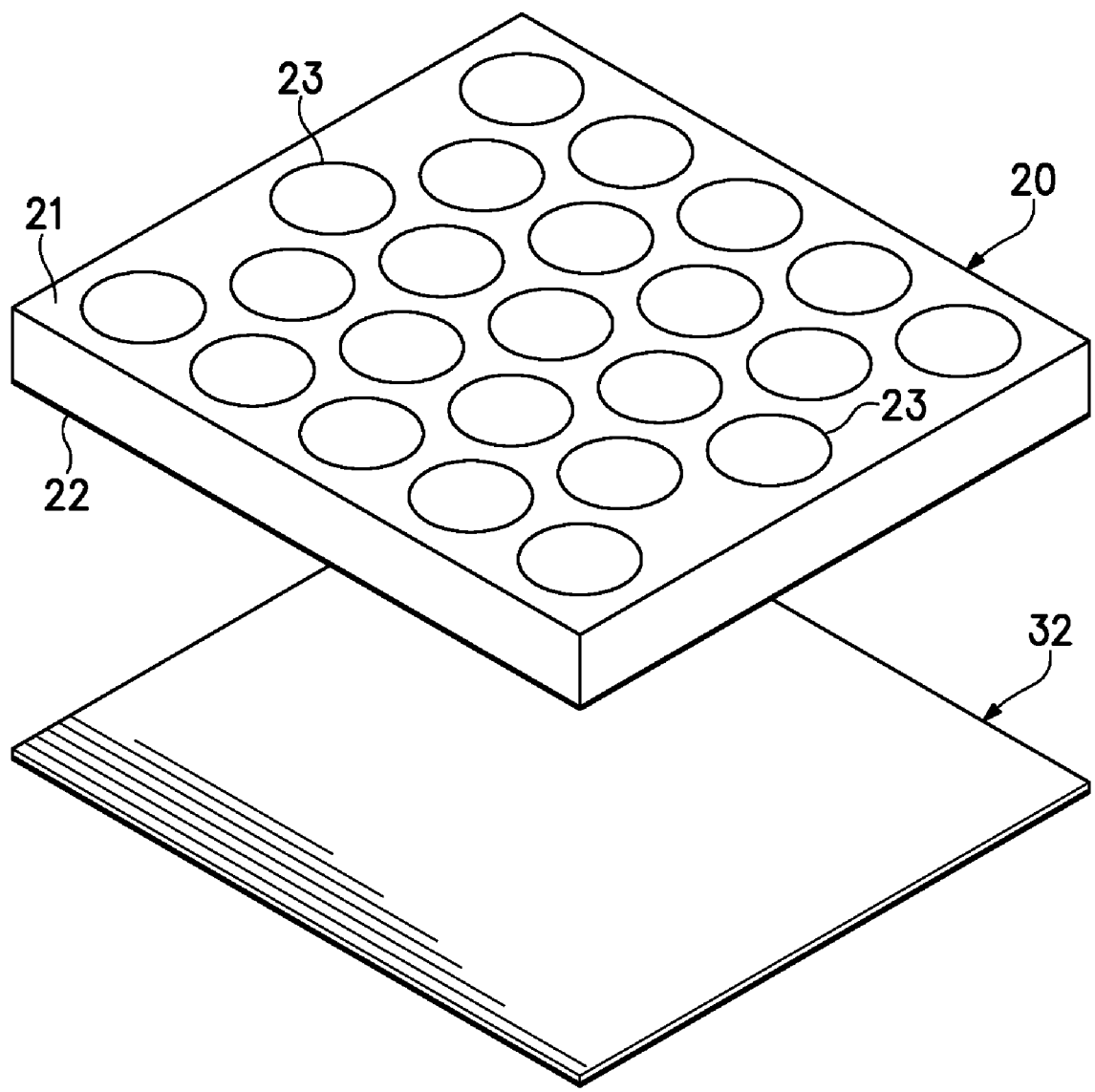
FIGS. 5A-5E are perspective views of a manufacturing process for the pad element.
Figure 5B:
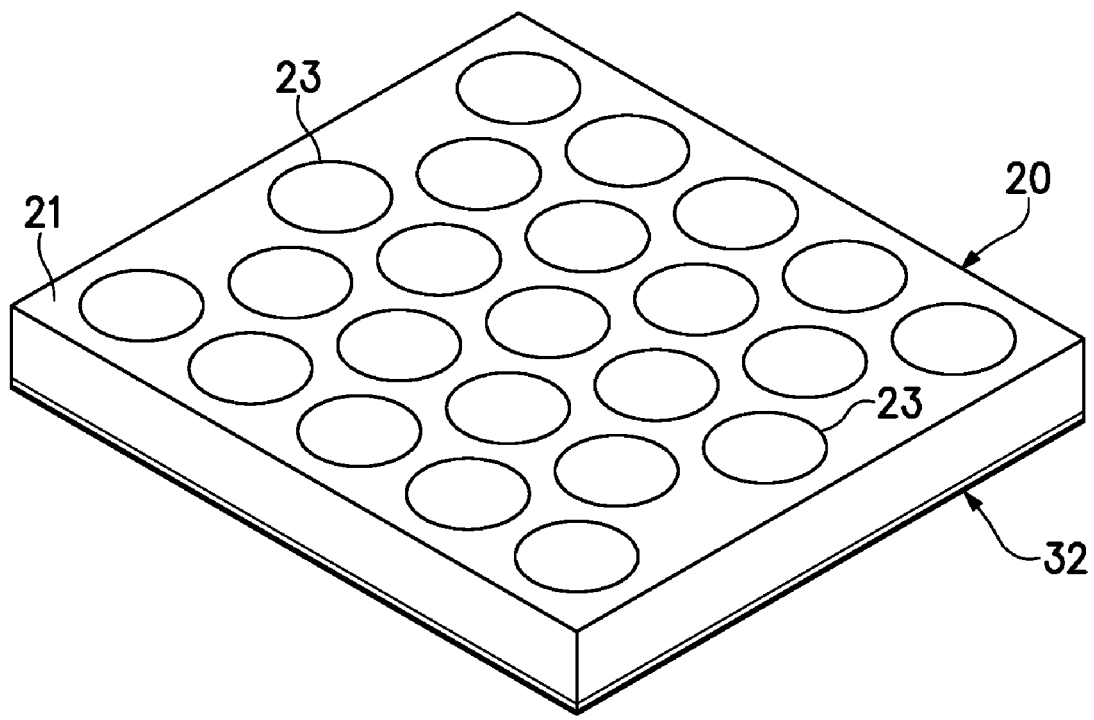

A variety of techniques may be utilized to manufacture pad element 10. With reference to FIGS. 5A-5E, an example of a suitable manufacturing process is discussed. Initially, base member 20 is formed to have an intended shape and to define the various apertures 23 through, for example, molding or cutting. Once base member 20 is formed, cover layer 32 is positioned relative to base member 20 and proximal to second surface 22, as depicted in FIG. 5A. An adhesive may be applied to either second surface 22 or cover layer 32 in order to effect bonding between base member 20 and cover layer 32. Although the adhesive may be applied to cover layer 32, an advantage of applying the adhesive to second surface 22 is that the adhesive is absent from areas of cover layer 32 corresponding with apertures 23. In some configurations, a spray adhesive or a thermally-activated adhesive that is applied with transfer paper may be utilized. In configurations of pad element 10 where base member 20 is formed from a thermoplastic polymer foam, heating and melting of base member 20 may be utilized to join base member 20 and cover layer 32, rather than an adhesive. Cover layer 32 is then placed in contact with second surface 22 to join cover layer 32 to base member 20, as depicted in FIG. 5B.

Figure 5C:
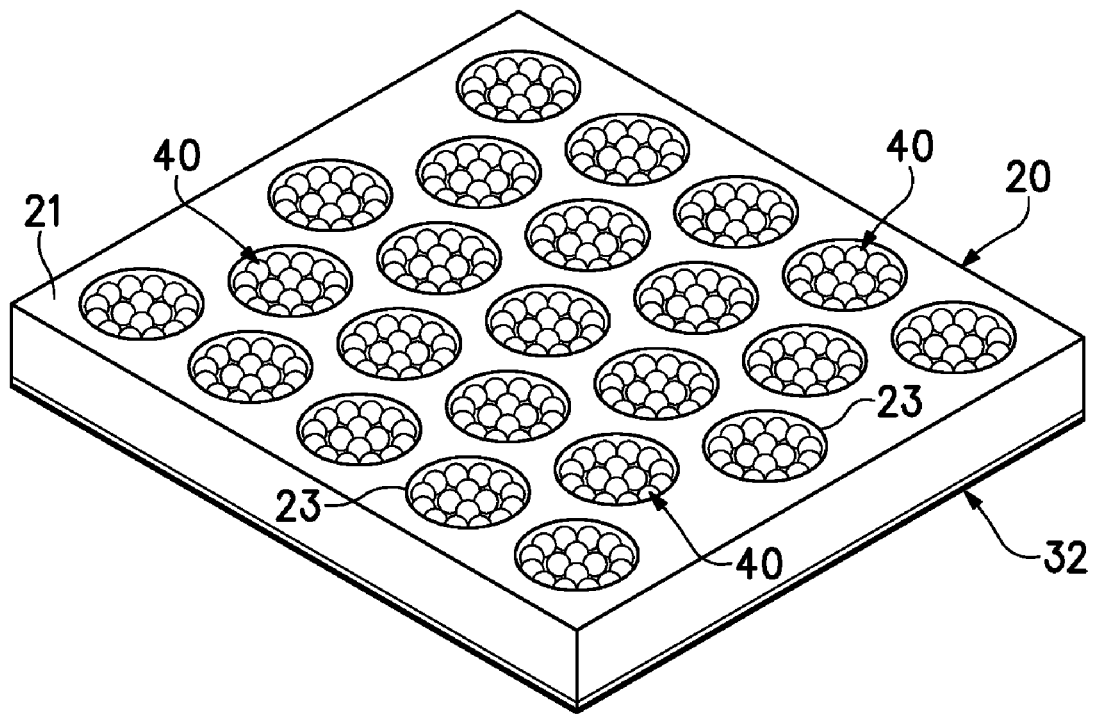

Once cover layer 32 is secured to base member 20, beads 40 are located within apertures 23, as depicted in FIG. 5C. A variety of methods may be utilized to place beads 40 within apertures 23. For example, a plurality of beads 40 may be poured over base member 20, and a blade may then wipe across first surface 21 in order to push beads 40 into apertures 23. Additionally, when the combination of base member 20 and cover layer 32 are located on a vacuum table, air drawn through apertures 23 and cover layer 32 may induce beads 40 to enter apertures 23. In some methods, pre-measured amounts of beads 40 may be poured into each of the individual apertures 23.

Figure 5D:
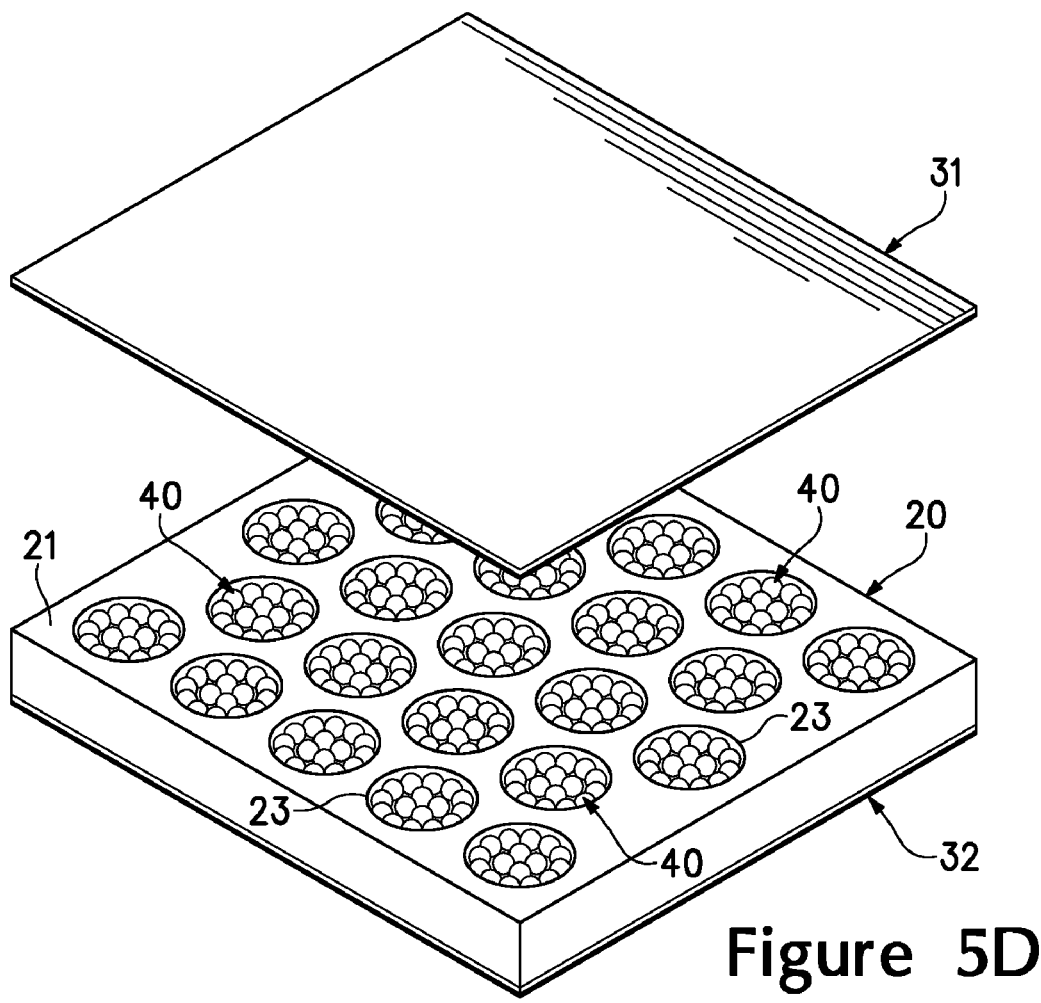
Figure 5E:
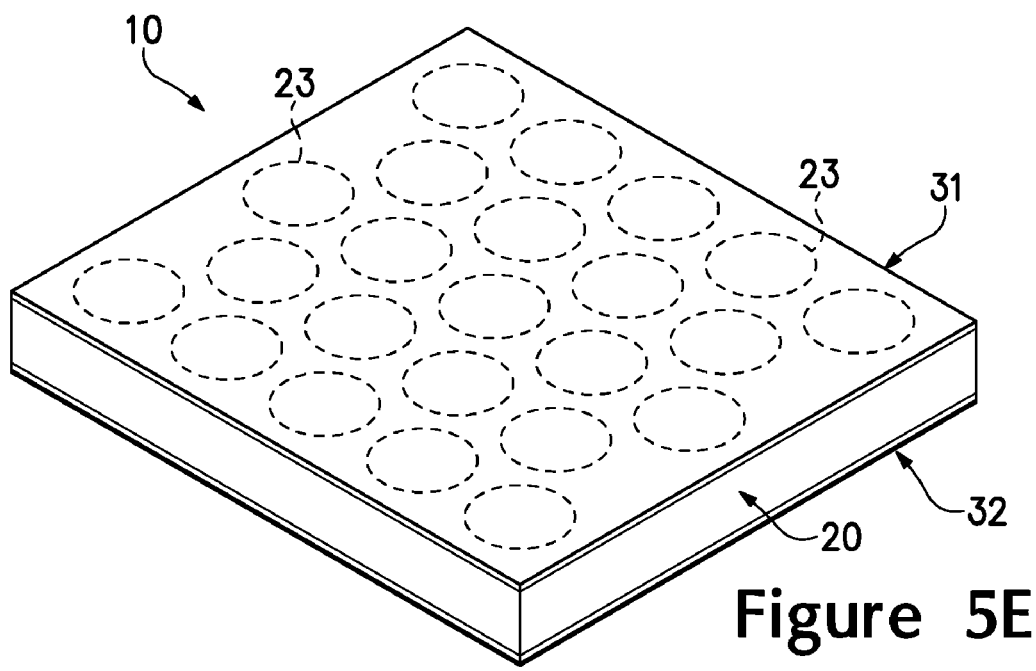

Following the placement of beads 40 within apertures 23, cover layer 31 is positioned relative to base member 20 and proximal to first surface 21, as depicted in FIG. 5D. As with an earlier stage of the manufacturing process, an adhesive may be applied to either first surface 21 or cover layer 31 in order to effect bonding between base member 20 and cover layer 31. Cover layer 31 is then placed in contact with first surface 21 to join cover layer 31 to base member 20, as depicted in FIG. 5E, thereby substantially completing the manufacture of pad element 10.

Pad Element Variations

Aspects of pad element 10 may vary, depending upon the intended use for pad element 10 and the product in which pad element 10 is incorporated. Moreover, changes to the dimensions, shapes, and materials utilized within pad element 10 may vary the overall properties of pad element 10. That is, by changing the dimensions, shapes, and materials utilized within pad element 10, the compressibility, impact force attenuation, breathability, flexibility, and overall mass of pad element 10 may be tailored to specific purposes or products. A plurality of variations for pad element 10 are discussed below. Any of these variations, as well as combinations of these variations, may be utilized to tailor the properties of pad element 10 to an intended use or particular product.

Figure 6A:
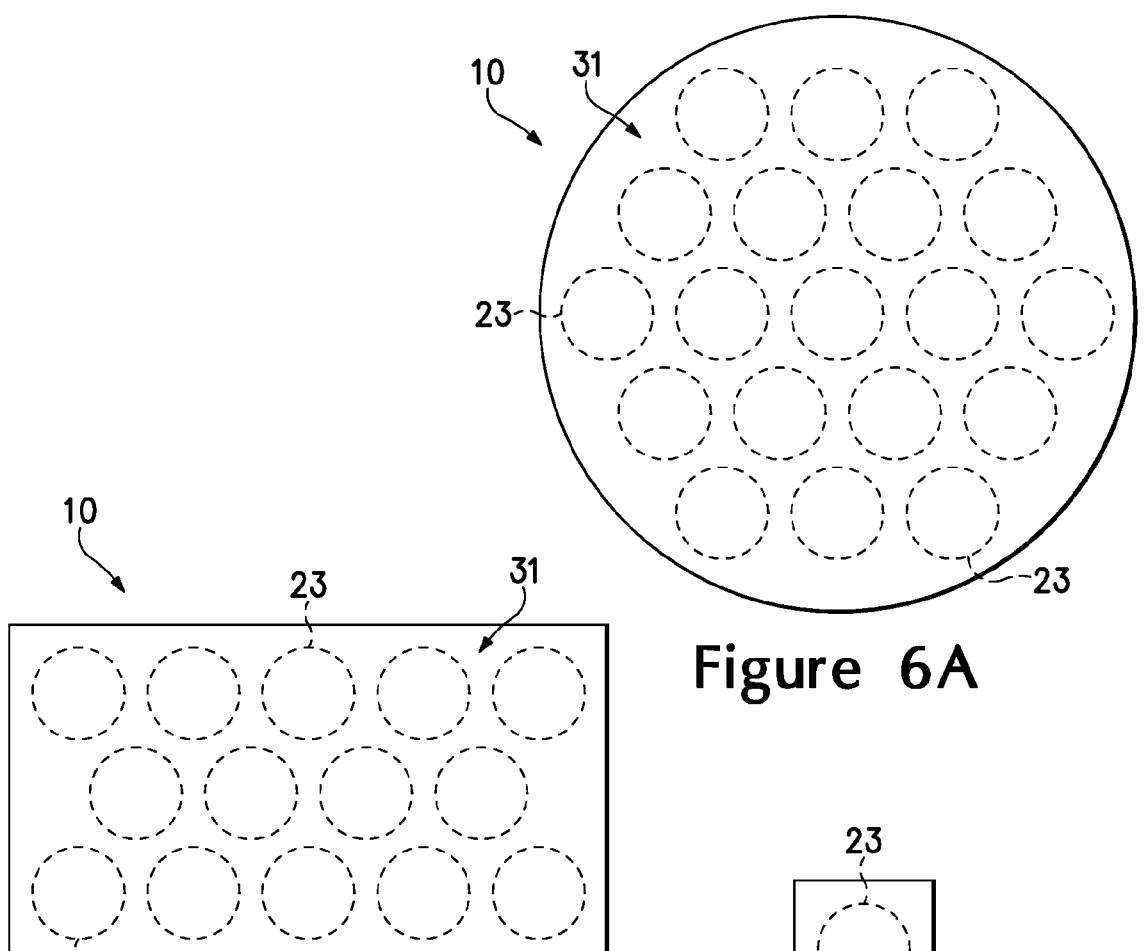
FIGS. 6A-6E are top plan views corresponding with FIG. 2 and depicting further configurations of the pad element.
Figure 6B:
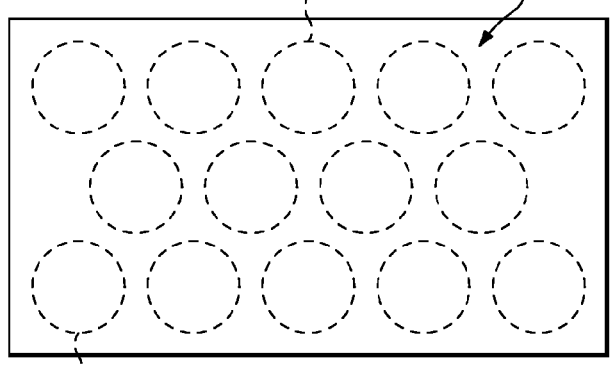
Figure 6C:
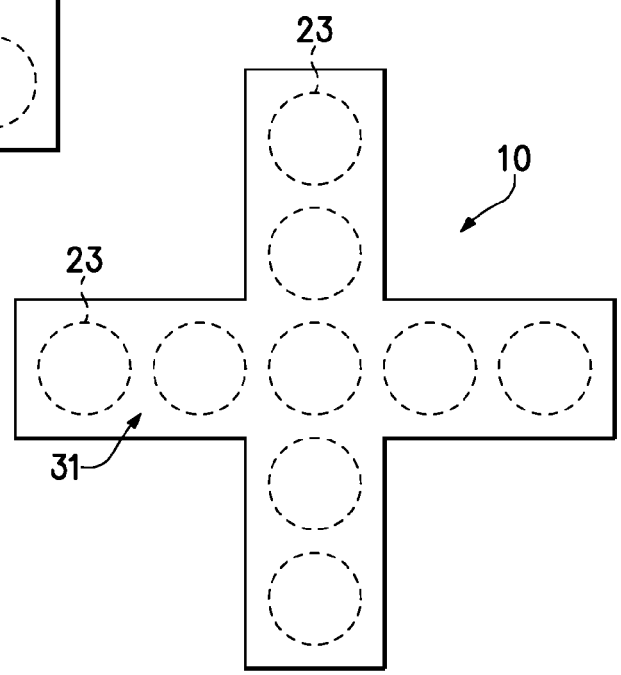
Figure 6D:
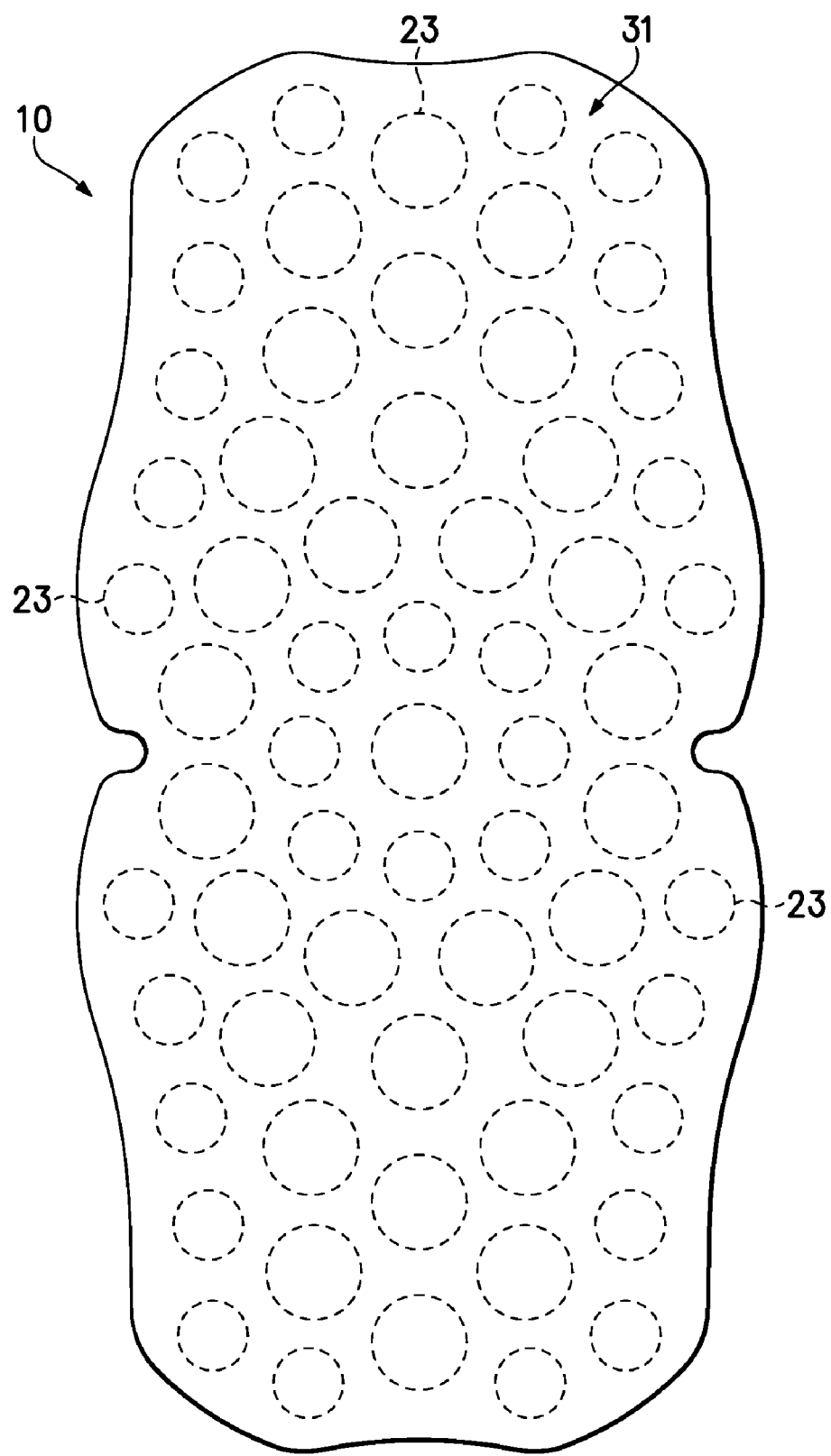

Whereas pad element 10 is depicted in FIGS. 1-4 as having a generally square configuration, pad element 10 may have the circular configuration depicted in FIG. 6A, the rectangular and elongate configuration depicted in FIG. 6B, a generally x-shaped configuration depicted in FIG. 6C, or the elongate and curved configuration depicted in FIG. 6D. Moreover, the shape of pad element 10 may vary significantly to have a variety of other shapes, such as oval, hexagonal, or non-regular. Accordingly, the overall shape of pad element 10 may vary significantly.

Figure 6E:
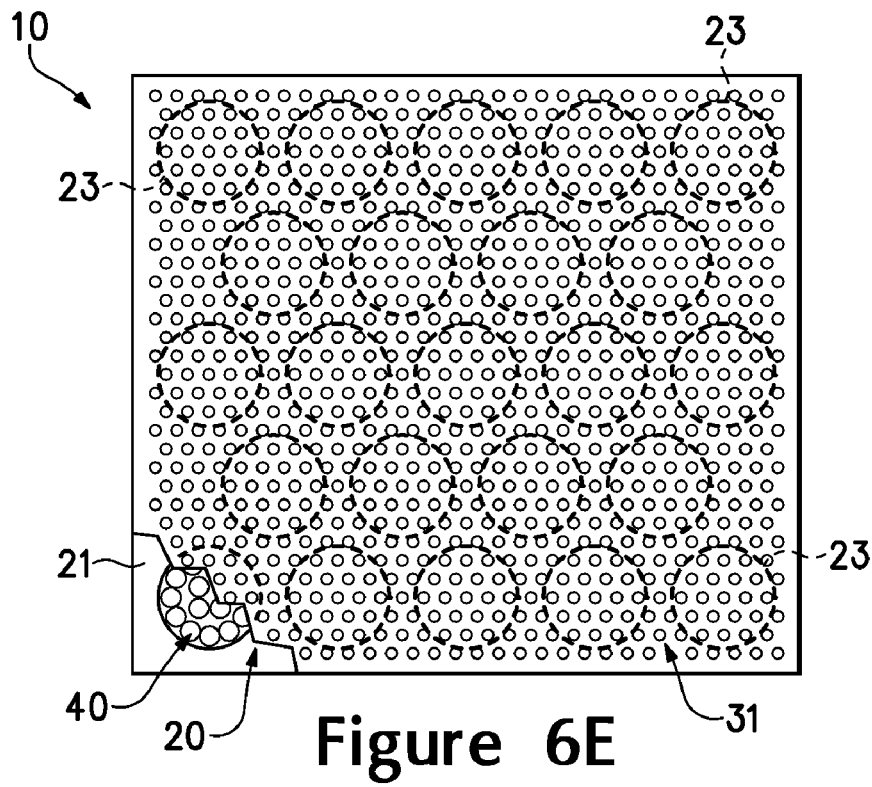

Referring to FIG. 6E, cover layer 31 is depicted as having a plurality of perforations or small holes. An advantage to utilizing a textile material for cover layers 31 and 32 is that air and moisture may freely pass through the textile material. In some configurations of pad element 10, however, polymer sheets or other non-permeable materials may be utilized for one or both of cover layers 31 and 32. When permeability is desired, however, perforations or small holes may be formed in the polymer sheet or other non-permeable material to enhance the overall breathability of pad element 10.

Figure 7A:
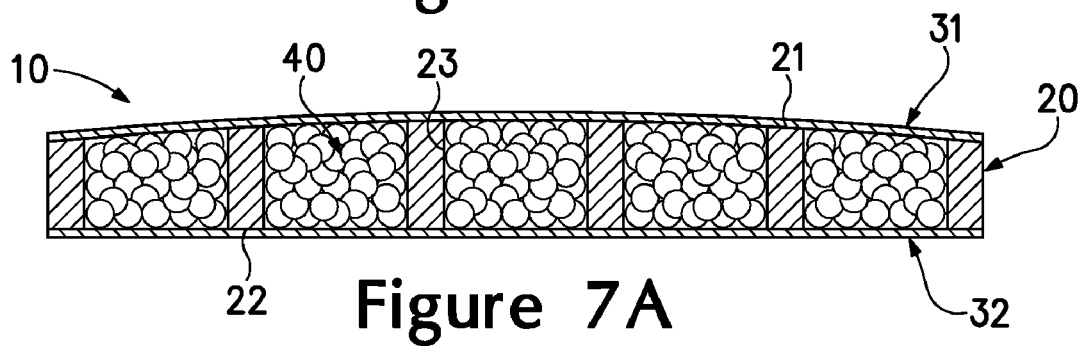
FIGS. 7A-7G are cross-sectional views corresponding with FIG. 3A and depicting further configurations of the pad element.
Figure 7B:
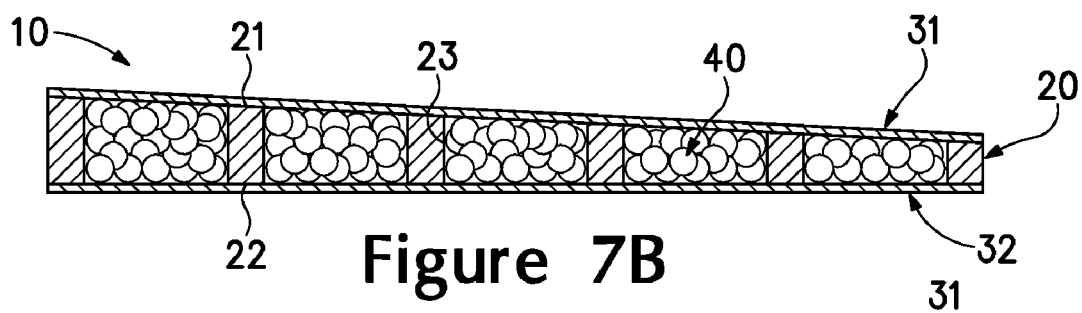
Figure 7C:
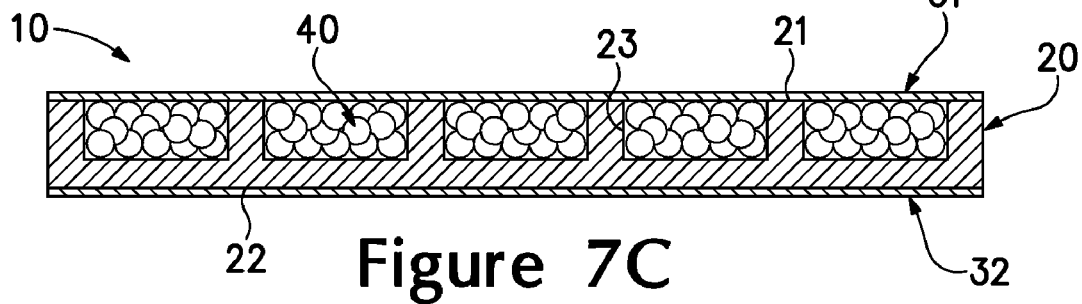

Surfaces 21 and 22 are depicted in FIGS. 1-4 as having both planar and parallel configurations. When incorporated into some products, however, contouring may be utilized to enhance the comfort of pad element 10 or provide different degrees of impact force attenuation to different areas of pad element 10. Referring to FIG. 7A, pad element 10 is depicted in a configuration wherein first surface 21 curves upward to impart a convex shape to pad element 10. Similarly, pad element 10 is depicted in a configuration wherein first surface 21 tapers toward second surface 22 in FIG. 7B. Although apertures 23 are discussed above as extending through base member 20 and between surfaces 21 and 22, apertures 23 may have a variety of configurations. As an example, apertures 23 may only extend partially between surfaces 21 and 22, as depicted in FIG. 7C.

Figure 7D:
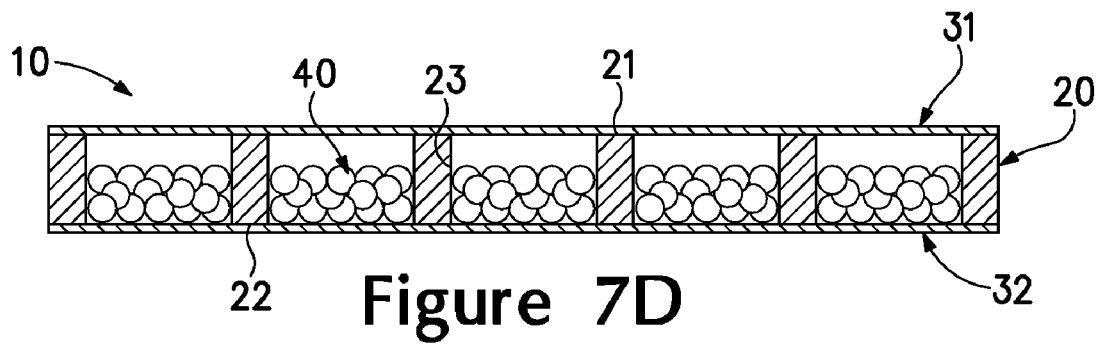
Figure 7E:
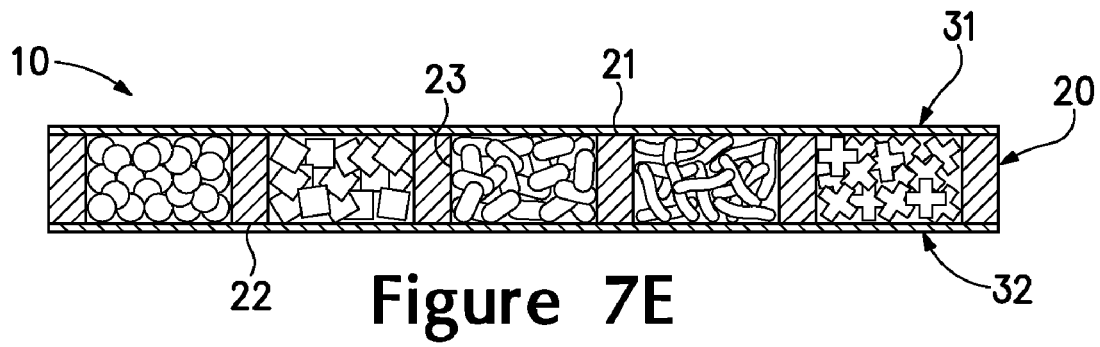

In addition to varying the configuration of base member 20, the number, shapes, and sizes of beads 40 may also vary. In each of the configurations discussed above, beads 40 substantially fill each of apertures 23. Depending upon the average size of beads 40, at least twenty beads 40 may be utilized to fill some of apertures 23, but the number of beads 40 that fill apertures 23 may range from six to two-hundred or more. An advantage to having at least twenty beads 40 within each of apertures 23 is that pad element 10 exhibits sufficient breathability while also providing impact force attenuation. In some configurations, beads 40 may only partially fill apertures 23, as depicted in FIG. 7D. Although beads 40 may have generally spherical shapes, beads to may also have, for example, cubic configurations, elongate configurations, non-discrete configurations, or x-shaped configurations, as depicted in FIG. 7E. Accordingly, the number, shapes, and sizes of beads 40 may vary significantly. Additionally, the polymer foam material forming beads 40 within a particular aperture 23 may be different than the polymer foam material forming beads 40 within a different particular aperture 23, or beads 40 within one aperture may be formed from two or more types of polymer foam material.

Figure 7F:
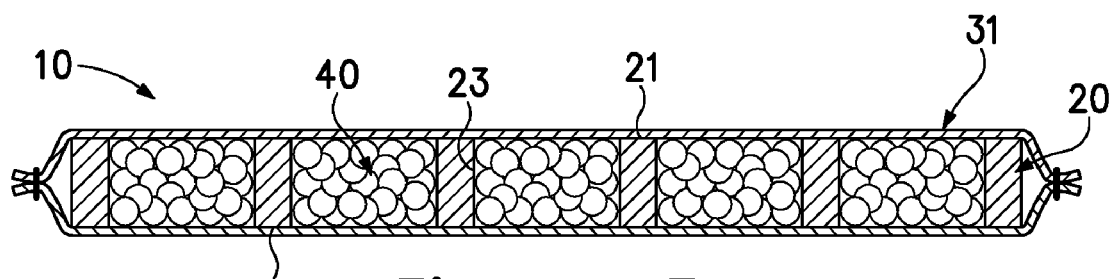
Figure 7G:
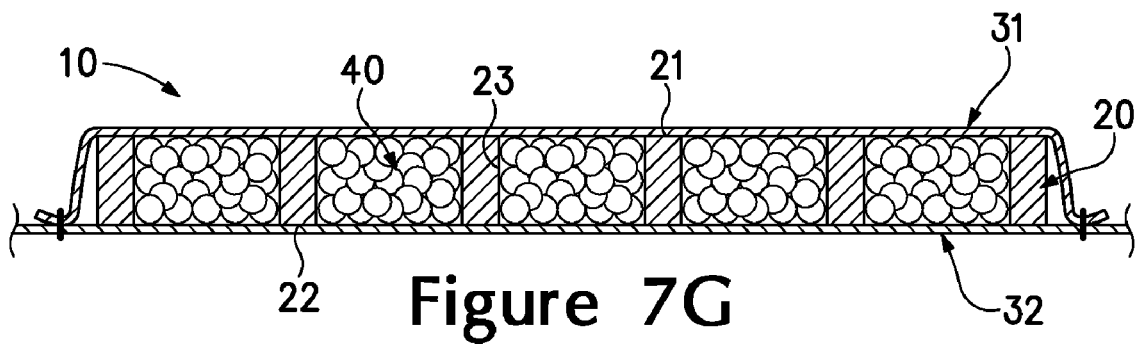

Although cover layers 31 and 32 may have the general shape and size of surfaces 21 and 22, cover layers 31 and 32 may also extend beyond the edges of surfaces 21 and 22. Referring to FIG. 7F, each of cover layers 31 and 32 extend outward from base member 20 and are joined along a sidewall of base member 20. Similarly, each of cover layers 31 and 32 extend outward from base member 20 in FIG. 7G, but cover layer 31 is secured to a larger cover layer 32. An advantage to these configurations is that the sidewall of base member 20 is also covered by cover layers 31 and 32. When incorporated into apparel or other products, the sidewall of base member 20 is not visible and only textiles form an exterior of pad element 10.

Figure 8A:
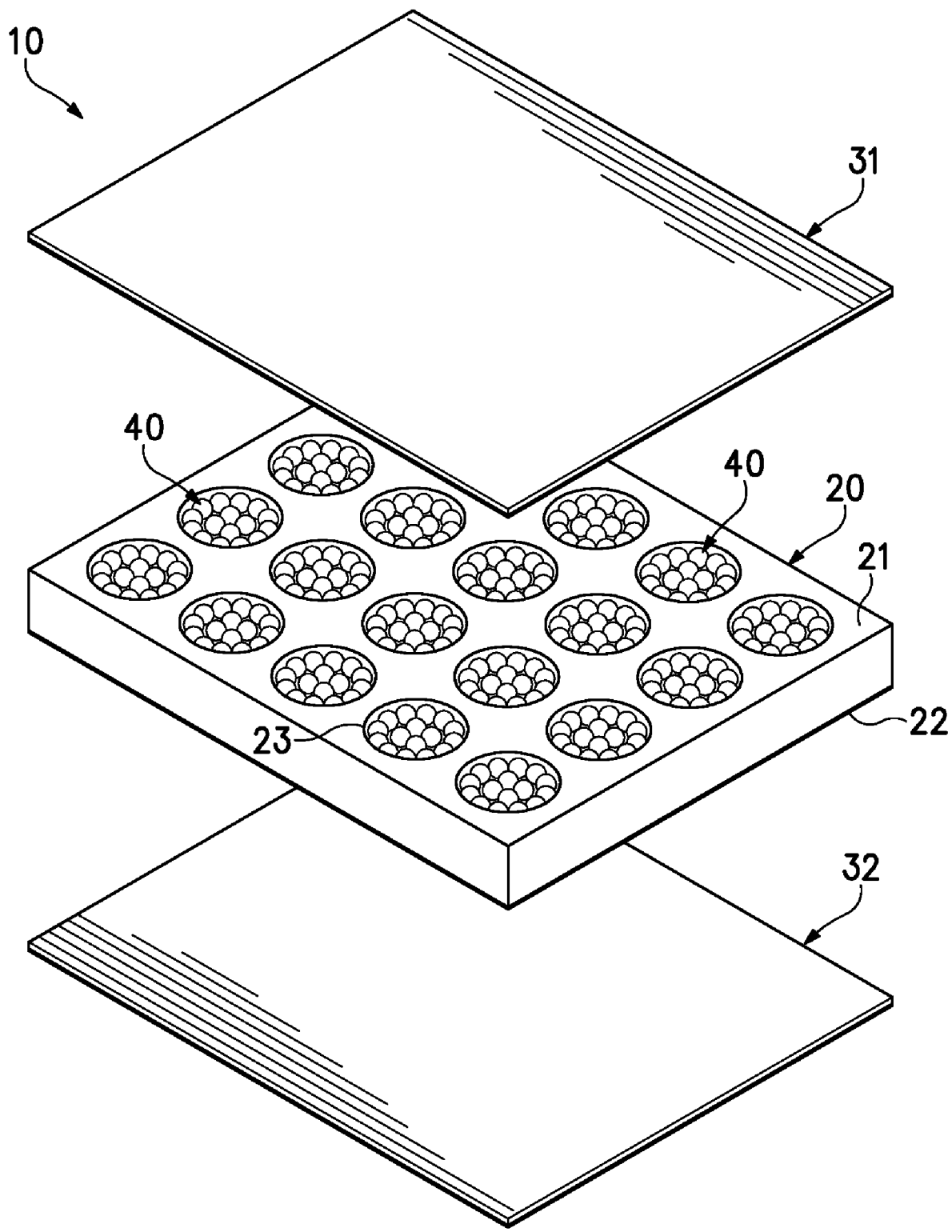
FIGS. 8A-8H are exploded perspective views corresponding with FIG. 4 and depicting further configurations of the pad element.
Figure 8B:
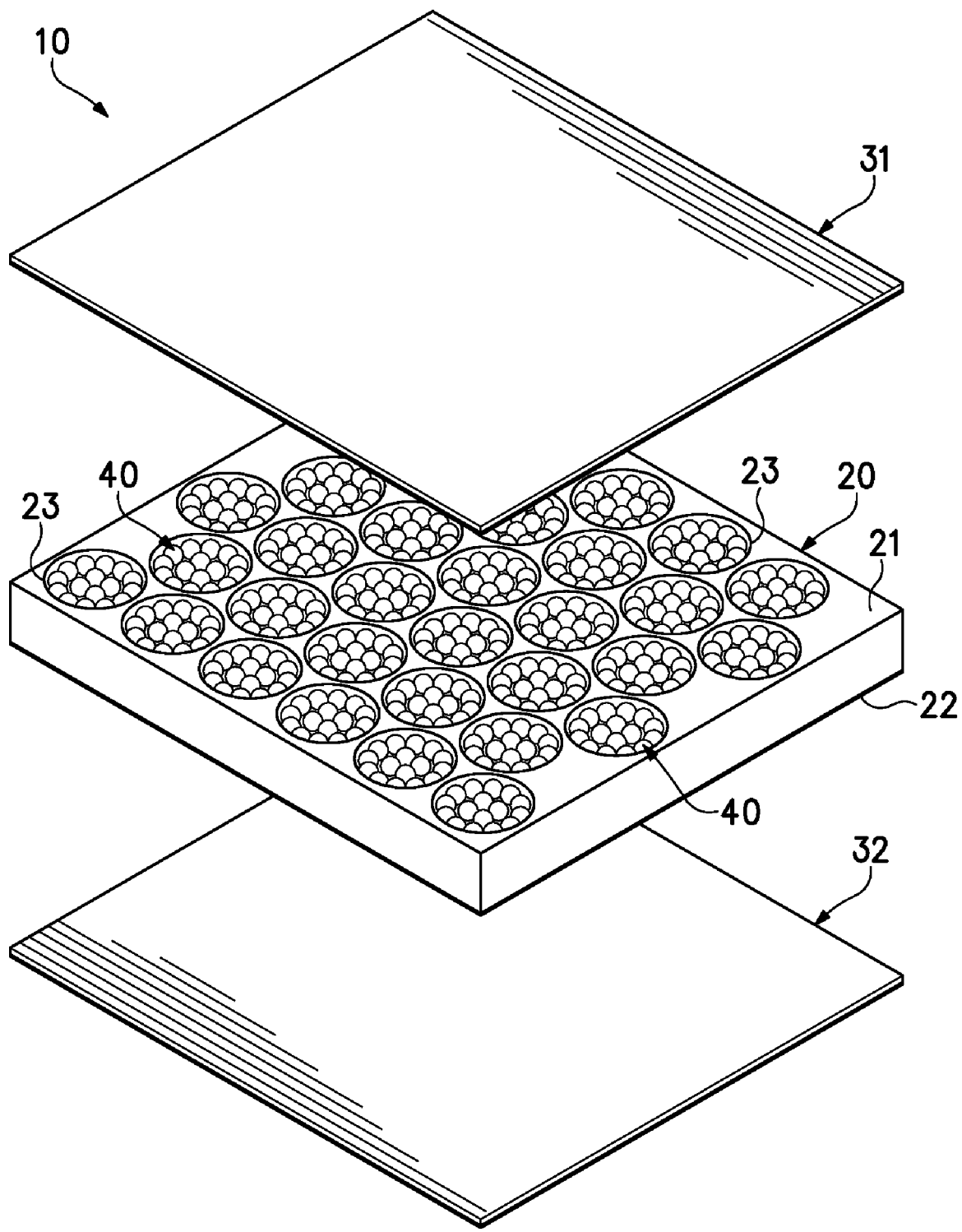
Figure 8C:
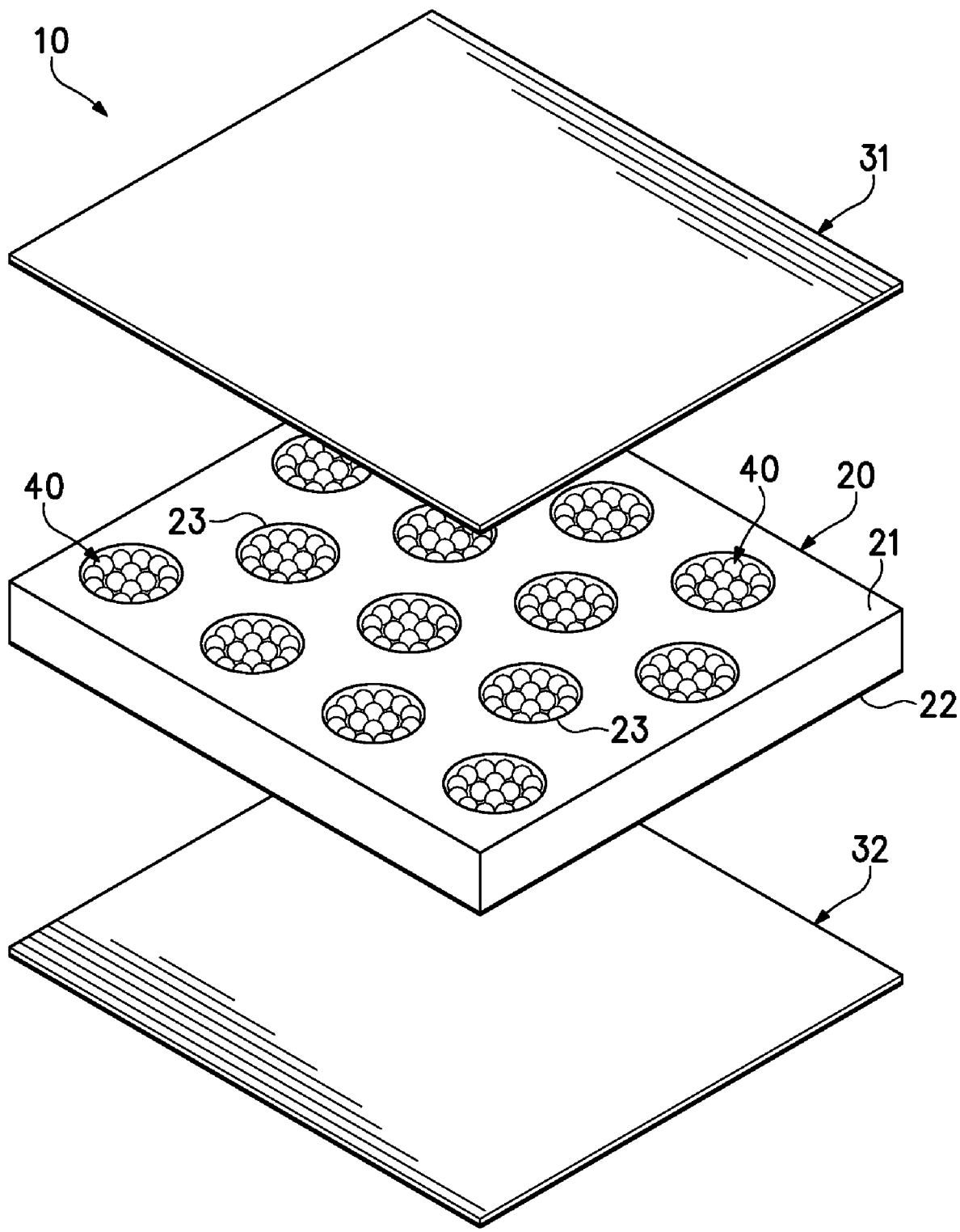
Figure 8D:
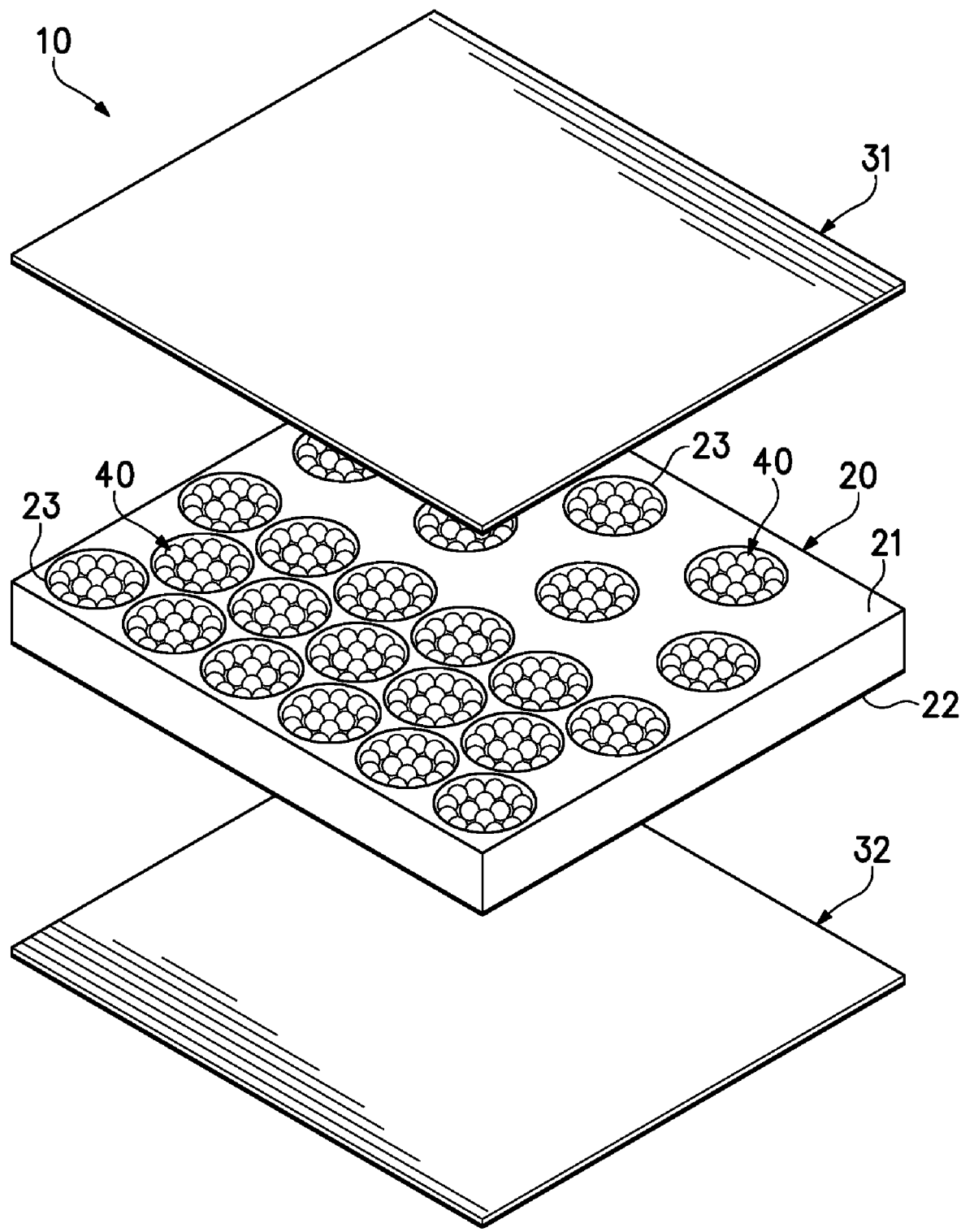
Figure 8E:
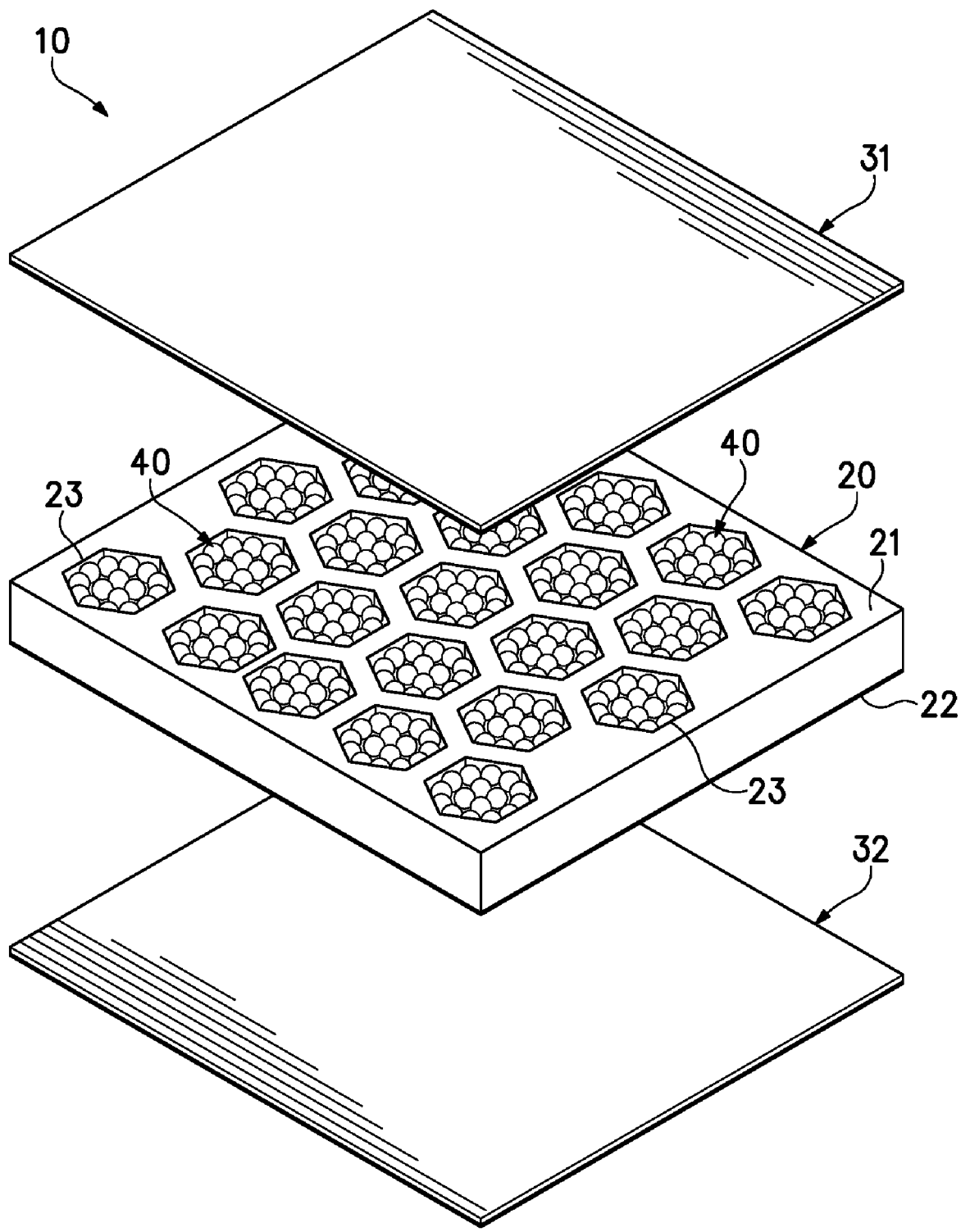
Figure 8F:
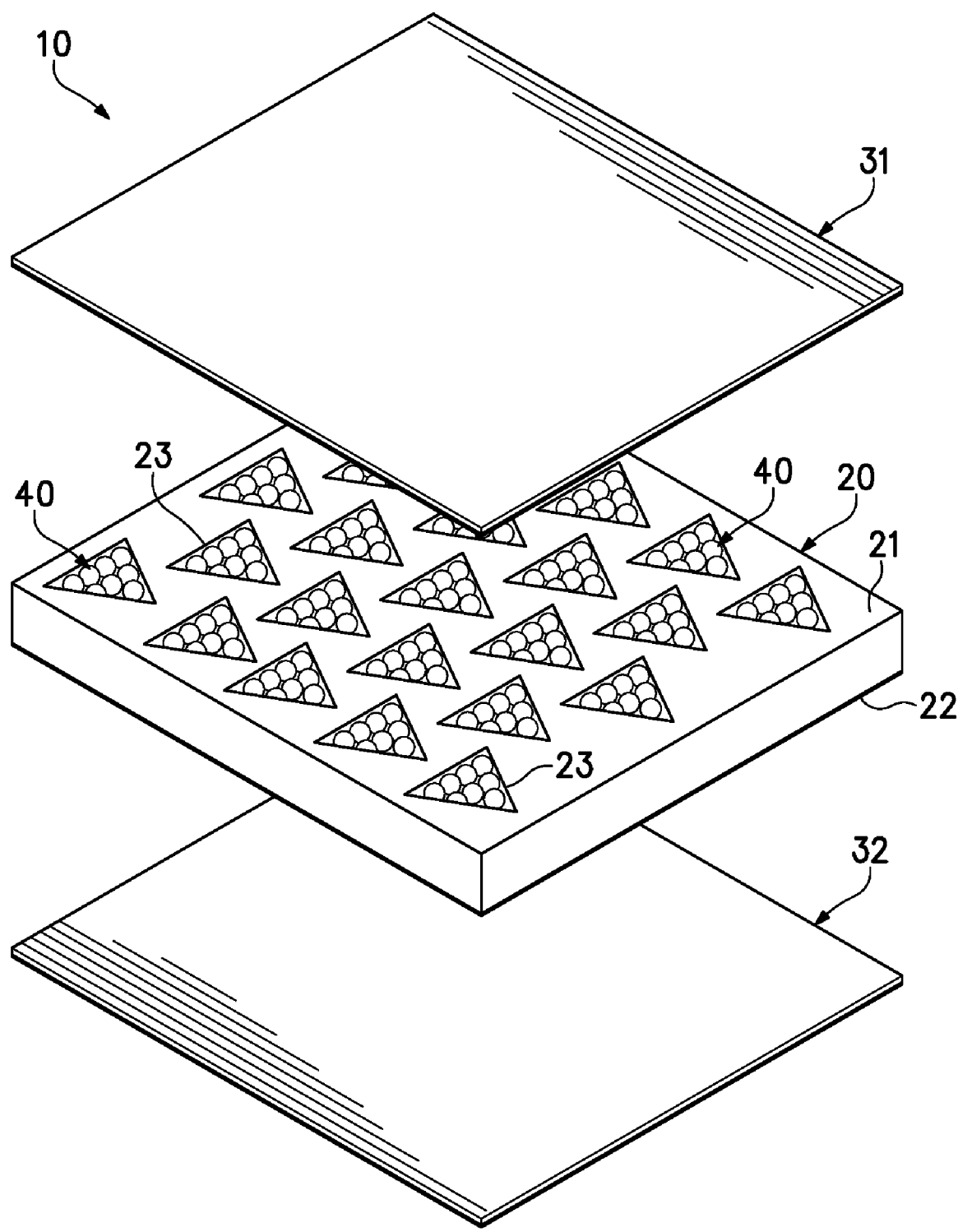
Figure 8G:
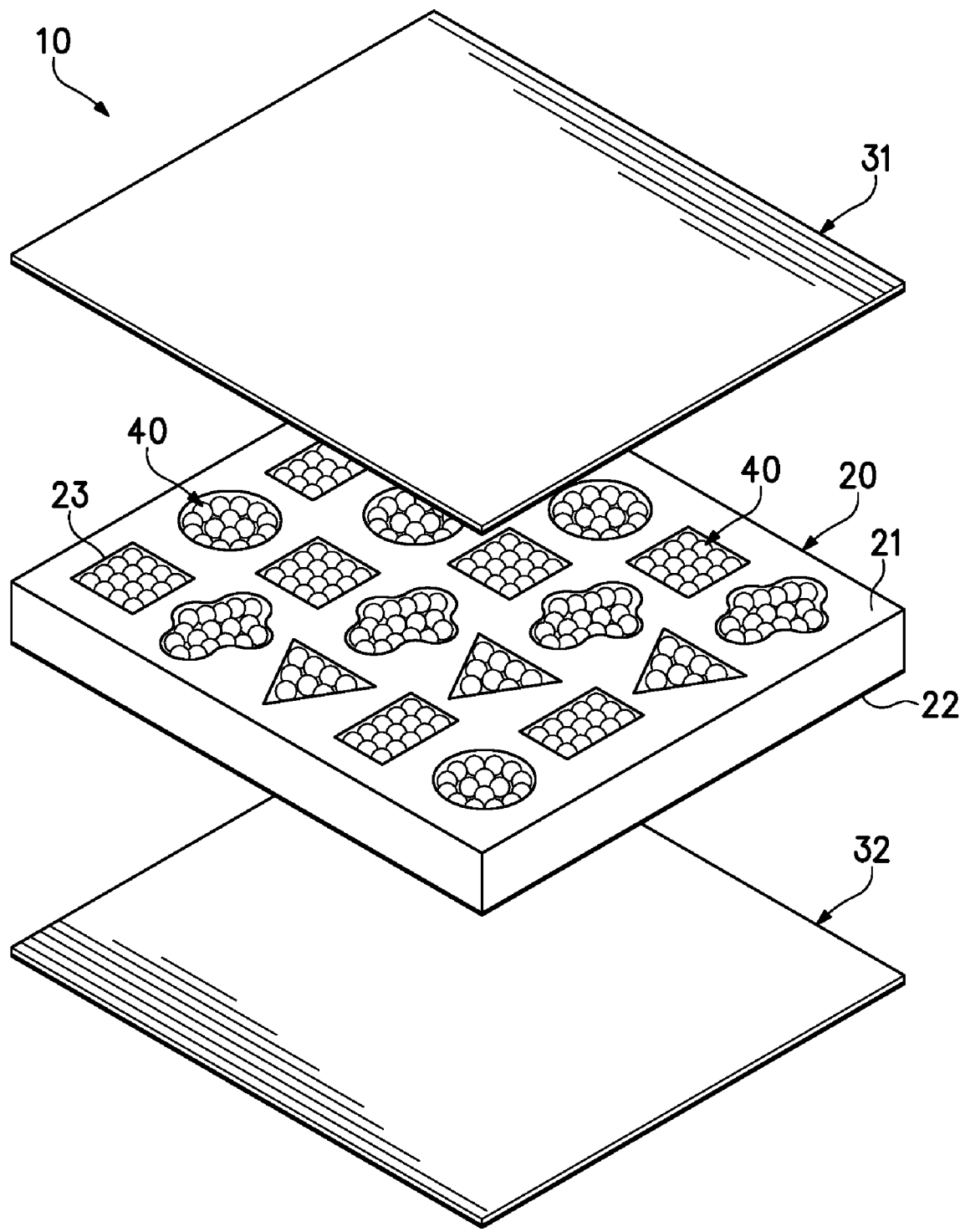
Figure 8H:
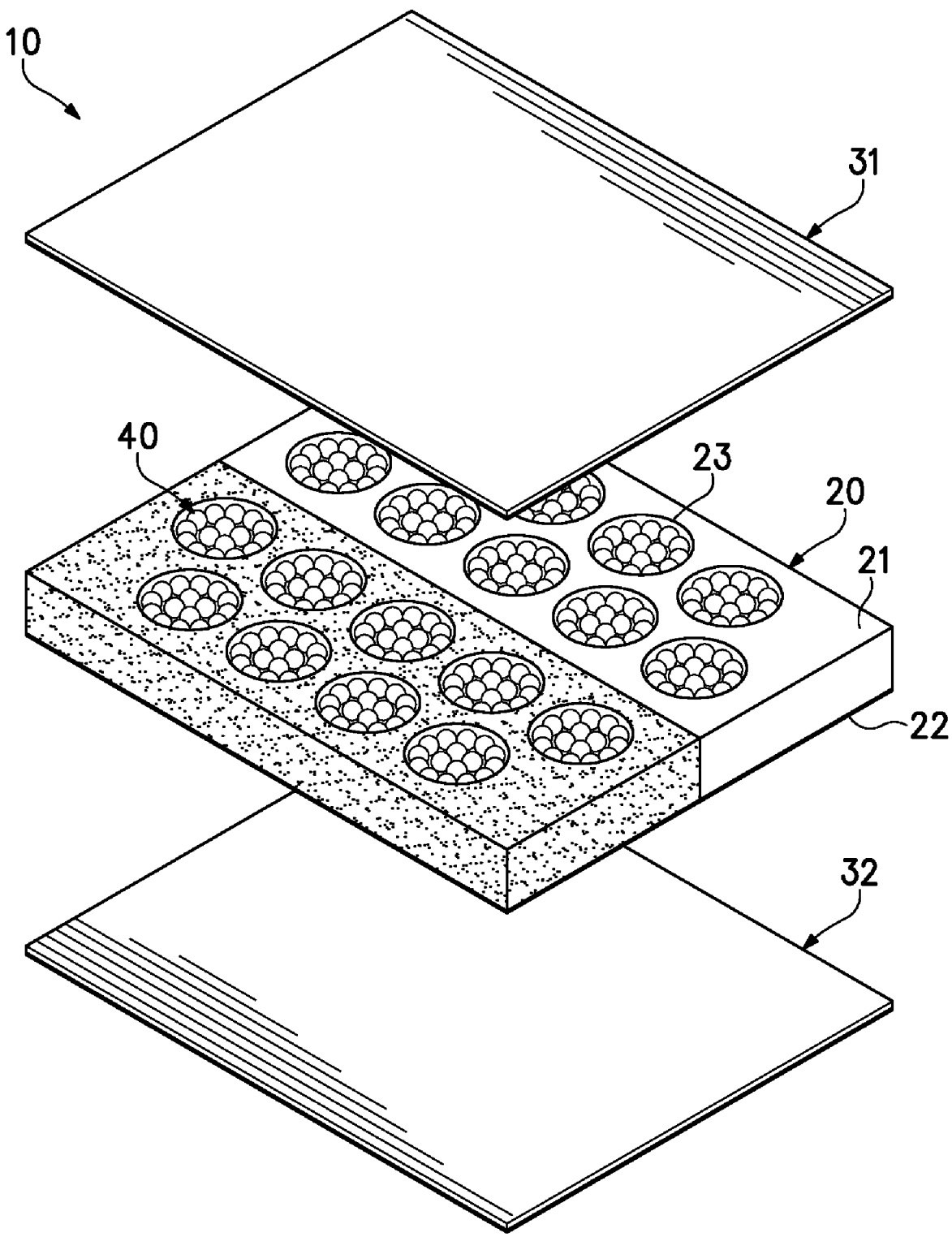

The arrangement of apertures 23 may have an effect upon various properties of pad element 10, including durability, breathability, and compressibility, for example. In the configuration depicted in FIGS. 1-4, apertures 23 are arranged in an off-set manner. As an alternative, apertures 23 may be arranged in a grid, as depicted in FIG. 8A. In some configurations, apertures 23 may be more packed together (i.e., less distance between edges of apertures 23), as depicted in FIG. 8B, or more spaced (i.e., more distance between edges of apertures 23), as depicted in FIG. 8C. As another variation, apertures 23 may be more packed together in one area of pad element 10 and more spaced in another area of pad element 10, as depicted in FIG. 8D. Although the spacing between apertures 23 may vary significantly, when a distance between edges of two adjacent apertures 23 is (a) in a range of two to ten millimeters or (b) in a range of ten percent and forty percent of a distance across one of apertures 23 the combination of durability, breathability, and compressibility are generally suitable for apparel applications. In addition to spacing between apertures 23, the shapes of apertures 23 may vary. Whereas apertures 23 are depicted as having circular shapes in FIGS. 1-4, apertures 23 may also have the hexagonal shape depicted in FIG. 8E, the triangular shape depicted in FIG. 8F, or the varying shapes depicted in FIG. 8G. A further variation wherein base member 20 is formed from two different types of polymer foam (e.g., polyurethane and ethylvinylacetate) is depicted in FIG. 8H.

Any of the various configurations of pad element 10 discussed above, or combinations of the configurations, may be utilized to tune or otherwise engineer the properties of pad element 10. By varying the shape of apertures 23, the spacing between apertures 23, the number of beads 40 within each aperture 23, the size of beads 40 within each aperture 23, the materials forming base member 20 and beads 40, and the thickness of base member 20, for example, the properties of pad element 10 may be selected for particular uses or products. Moreover, the properties of pad element 10 may vary within a single pad element 10. That is, one area of pad element 10 may have different properties than another area of pad element 10 by varying the shape of apertures 23, the spacing between apertures 23, the number of beads 40 within each aperture 23, the size of beads 40 within each aperture 23, the materials forming base member 20 and beads 40, and the thickness of base member 20, for example, between the two areas. Accordingly, a variety of modifications may be made to pad element 10 in order to tune or otherwise engineer the properties of pad element 10 for particular uses or products.

Product Configurations

Figure 9A:
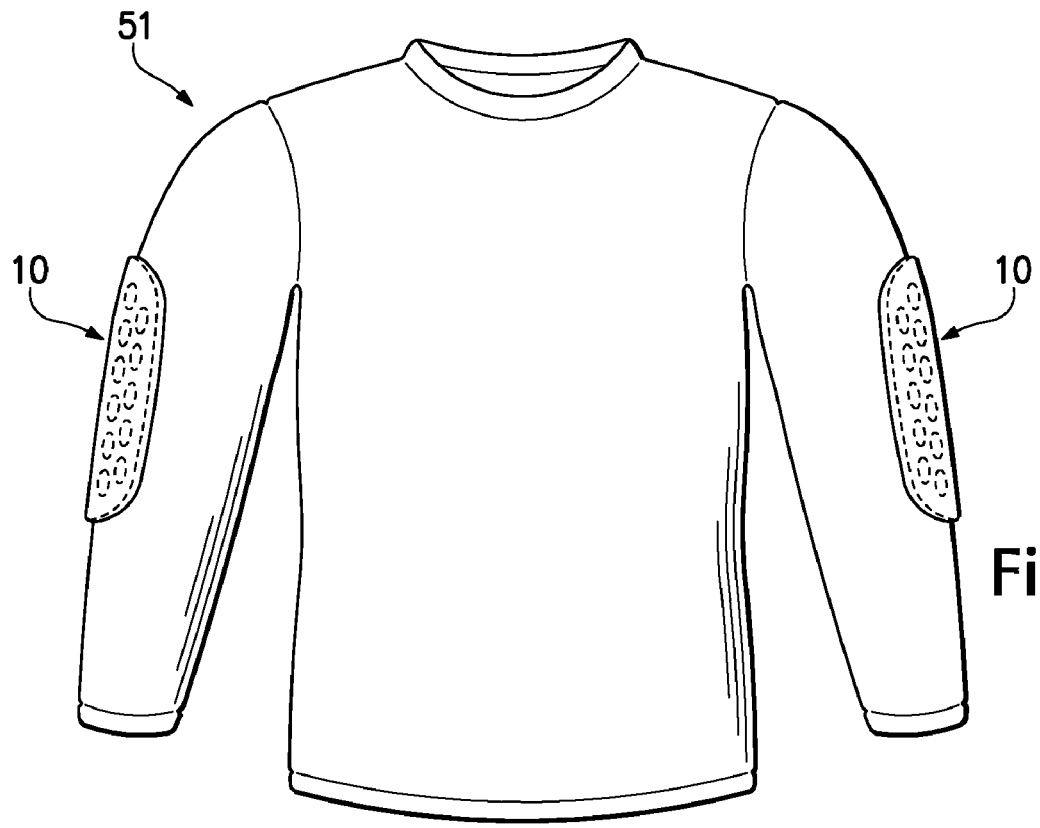
FIGS. 9A-9G are elevational views of articles of apparel incorporating the pad element.

Different configurations of pad element 10 that may be incorporated into a variety of products, including articles of apparel, mats, seat cushions, and backpacks, for example. Referring to FIG. 9A, a shirt 51 is depicted as including two pad elements 10 in locations that correspond with elbows of a wearer. When worn, pad elements 10 may provide protection to the elbows. That is, pad elements 10 may attenuate impact forces upon the elbows. In addition to attenuating impact forces, pad element 10 may also simultaneously provide one or more of breathability, flexibility, a relatively low overall mass, and launderability. Although shirt 51 is depicted as a long-sleeved shirt, shirt 51 may have the configuration of other shirt-type garments, including short-sleeved shirts, tank tops, undershirts, jackets, and coats, for example.

A variety of techniques may be utilized to incorporate pad elements 10 into shirt 51. As an example, pad elements 10 may be stitched or otherwise bonded to materials forming shirt 51. In some configurations, pad element 10 may have the configuration depicted in FIG. 7F, wherein each of cover layers 31 and 32 extend outward from base member 20 and are joined along a sidewall of base member 20. In other configurations, pad element 10 may have the configuration depicted in FIG. 7G, wherein each of cover layers 31 and 32 extend outward from base member 20, but cover layer 31 is secured to a larger cover layer 32. Moreover, the configuration of FIG. 7G may be utilized when the material forming shirt 51 and cover layer 32 are the same element. That is, cover layer 32 may be absent such that the material forming shirt 51 also forms the absent cover layer 32.

Shirt 51 may be intended for use as a compression garment. In addition to therapeutic uses, compression garments are often worn by athletes as a base layer under jerseys or other athletic apparel. In general, compression garments or other garments intended as base layers (a) exhibit a relatively tight fit that lays adjacent to the skin of the wearer and (b) stretch to conform with the contours of the wearer. While the textile materials forming compression garments may have one-directional stretch of, for example, more than ten percent prior to tensile failure, the textile materials forming other compression garments have two-directional stretch of at least thirty percent prior to tensile failure. Accordingly, when shirt 51 is formed to have a relatively tight fit and to stretch to conform with the contours of the wearer, the textile materials forming shirt 51 may have two-directional stretch of at least thirty percent prior to tensile failure. Moreover, an advantage to forming shirt 51 to be a compression garment is that pad elements 10 are located immediately adjacent to the skin of the wearer and the tighter materials cause pad elements 10 to flex to the shape of the wearer.

Figure 9B:
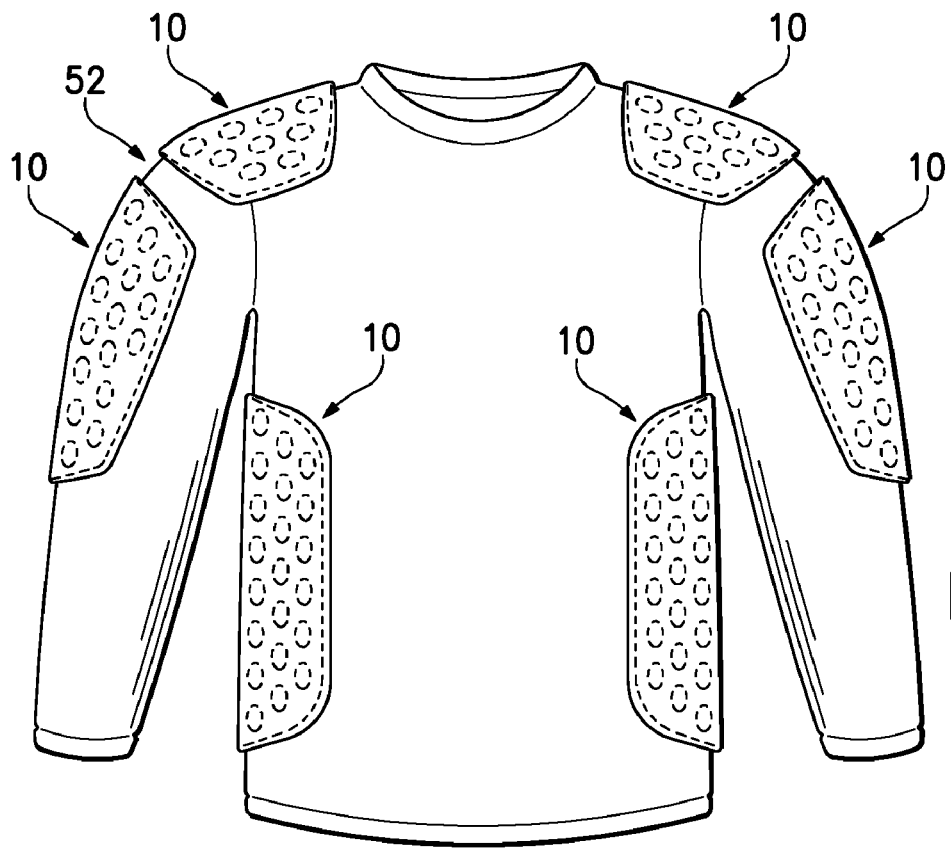

In addition to being located in elbow regions of a garment, pad elements 10 may also be located in other areas. Referring to FIG. 9B, a shirt 52 is depicted as including six pad elements 10 in locations that correspond with elbows, shoulders, and sides of a wearer. When worn, pad elements 10 may provide protection to each of the elbows, shoulders, and sides. That is, pad elements 10 may attenuate impact forces upon the elbows, shoulders, and sides. In addition to attenuating impact forces, pad elements 10 may also simultaneously provide one or more of breathability, flexibility, a relatively low overall mass, and launderability.

Figure 9C:
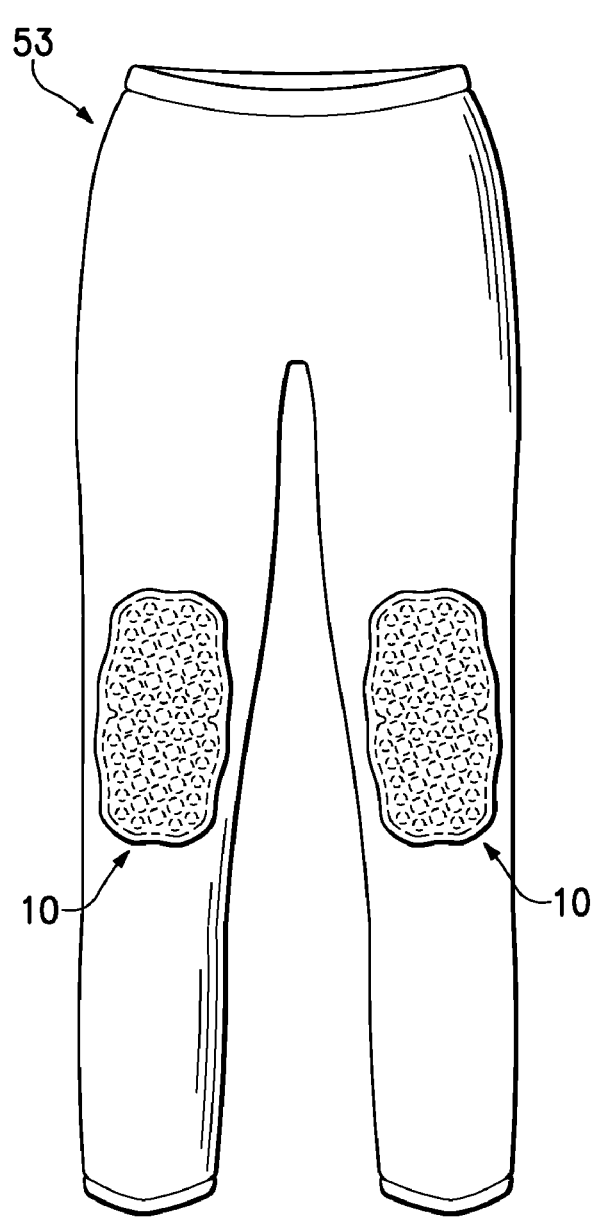
Figure 9D:
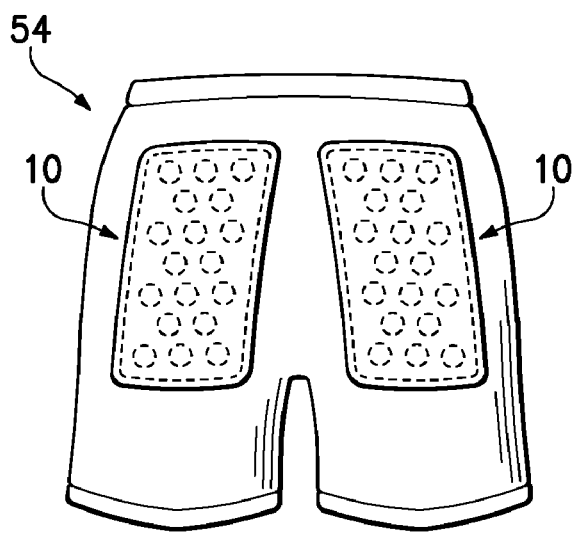

Referring to FIG. 9C, a pair of pants 53 is depicted as including two pad elements 10 in locations that correspond with knees of a wearer. When worn, pad elements 10 may provide protection to the knees. In addition to being located in knee regions of a garment, pad elements 10 may also be located in other areas. Referring to FIG. 9D, a pair of shorts 54 (e.g., bicycling shorts) is depicted as including two pad elements 10 in locations that correspond with the buttocks of a wearer. When worn, pad elements 10 may provide protection to the buttocks. Although pad elements 10 may be incorporated into pants 53 and shorts 54, pad elements 10 may also be incorporated into other pants-type garments, including briefs, jeans, and underwear. In some configurations, pad elements 10 may be incorporated into articles of apparel that are combinations of shirt-type garments and pants-type garments, including bodysuits, leotards, unitards, and wetsuits.

Figure 9E:
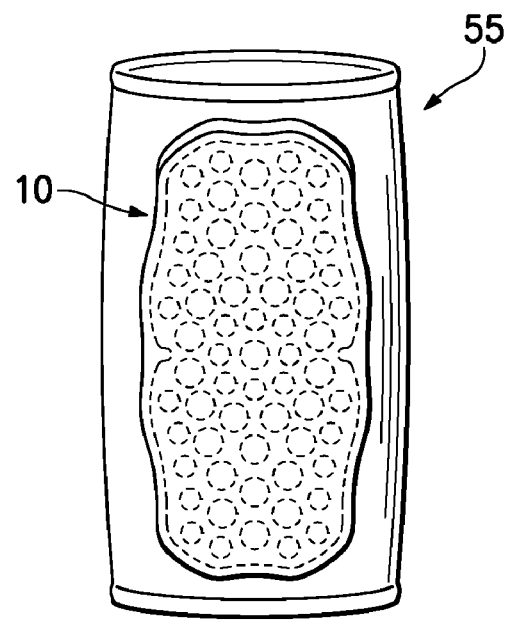
Figure 9F:
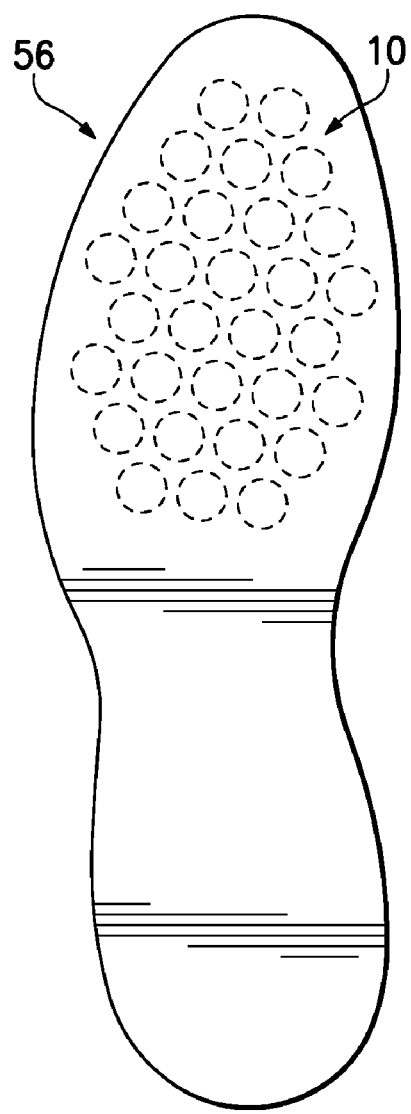
Figure 9G:
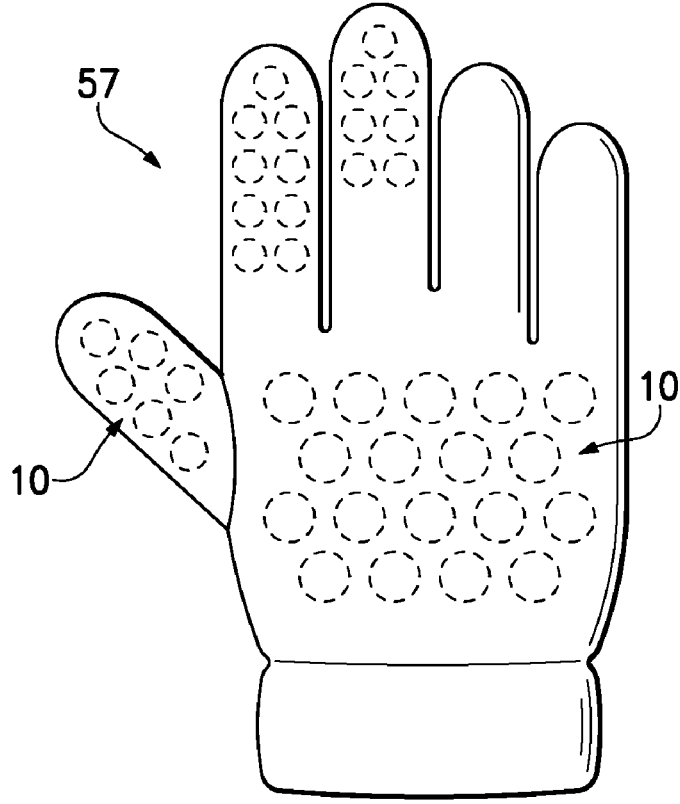

In addition to shirt-type garments and pants-type garments, pad elements 10 may be incorporated into garments that cover other areas of the wearer, such as hats, helmets, wraps, footwear, socks, and gloves, for example. As an example, a wrap 55 having one pad element 10 is depicted in FIG. 9E. Wrap 55 has a generally cylindrical configuration that may be placed upon an arm or a leg of a wearer. When, for example, the wearer's elbow is sore or injured, pad element 10 may be located over the elbow to assist with protecting the elbow during athletic activities. As another example, a sockliner 56 is at least partially formed from a pad element 10 is depicted in FIG. 9F. Sockliner 56 may be located within an article of footwear to cushion a lower (i.e., plantar) surface of the foot. Additionally, one or more pad elements 10 may be incorporated into a glove 57, as depicted in FIG. 9G, to impart protection to a hand of the wearer. In addition to attenuating impact forces, pad elements 10 in these configurations may also simultaneously provide one or more of breathability, flexibility, a relatively low overall mass, and launderability.

Figure 10A:
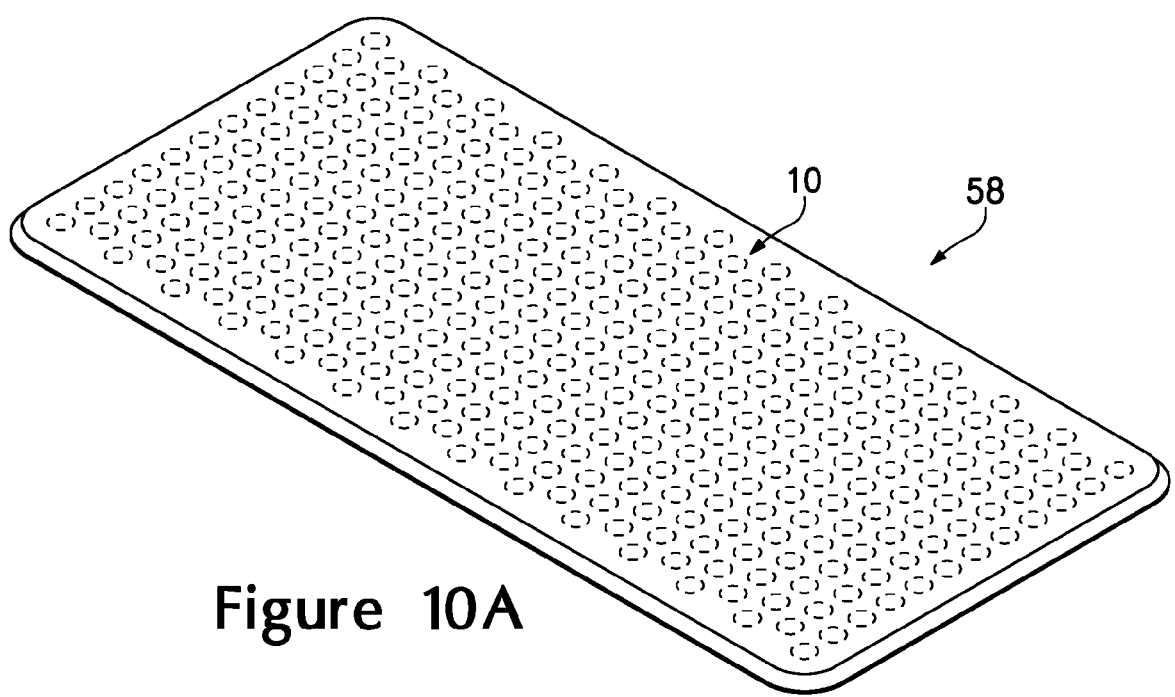
FIGS. 10A-10C are perspective views of further products incorporating the pad element.
Figure 10B:
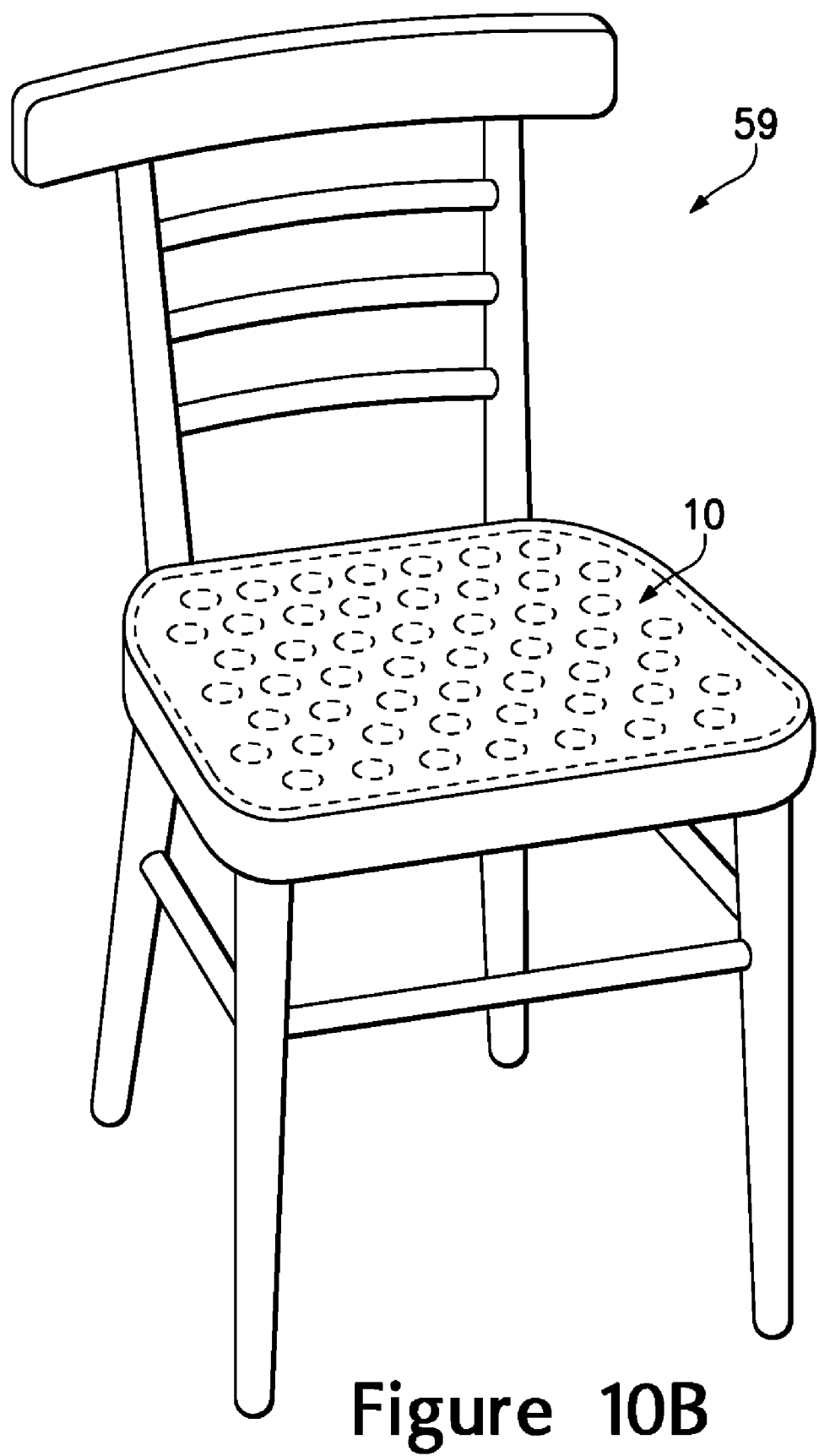
Figure 10C:
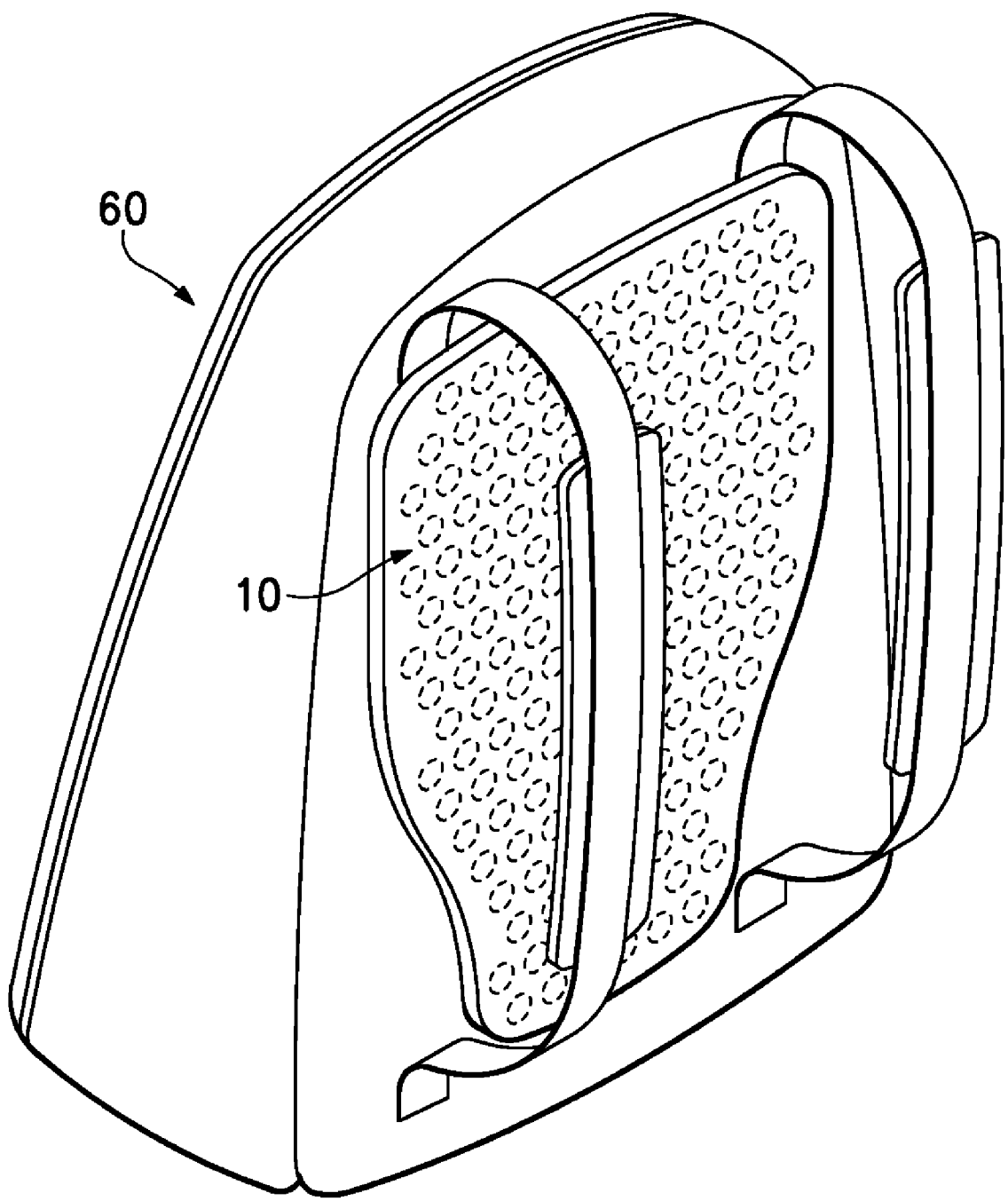

Pad elements 10 may also be utilized in products other than apparel. Referring to FIG. 10A, a mat 58 is depicted as being primarily formed from one pad element 10. Mat 58 may be utilized, for example, during yoga or as a camping pad to provide a comfortable surface for sitting or laying on the ground. A pad element 10 may also be incorporated into a chair 59, as depicted in FIG. 10B, to provide a comfortable place to sit. Similarly, a pad element 10 may be incorporated into a cushion that may be placed upon a chair or upon bleachers at a sporting event, for example. Also, a pad element 10 may be incorporated into a backpack 60, as depicted in FIG. 10C, to provide cushioning against the back of the wearer. Accordingly, various configurations of pad elements 10 may be incorporated into a plurality of products.

The invention is disclosed above and in the accompanying figures with reference to a variety of configurations. The purpose served by the disclosure, however, is to provide an example of the various features and concepts related to the invention, not to limit the scope of the invention. One skilled in the relevant art will recognize that numerous variations and modifications may be made to the configurations described above without departing from the scope of the present invention, as defined by the appended claims.

The invention claimed is:

1. A pad element comprising:
a base member having a first surface, an opposite second surface, and a plurality of apertures, each of the apertures defining an edge surface extending from the first surface to the second surface, the base member being formed from a polymer foam material;
a first textile layer secured to the first surface of the base member and extending across portions of the apertures positioned adjacent to the first surface;
a second textile layer secured to the second surface of the base member and extending across portions of the apertures positioned adjacent to the second surface; and
a plurality of beads located within the apertures and between the first textile layer and the second textile layer, the beads being formed from a polymer foam material.

2. The pad element recited in claim 1, wherein the apertures have a circular shape.

3. The pad element recited in claim 1, wherein the first surface and the second surface of the base member are substantially planar.

4. The pad element recited in claim 1, wherein the first surface and the second surface of the base member are substantially parallel to each other.

5. The pad element recited in claim 1, wherein the beads have a substantially spherical shape.

6. The pad element recited in claim 1, wherein at least twenty of the beads are located within each of the apertures.

7. The pad element recited in claim 1, wherein the apertures include a first aperture and a second aperture that are adjacent to each other, a distance between an edge of the first aperture and an edge of the second aperture being in a range of two to ten millimeters.

8. The pad element recited in claim 1, wherein the apertures include a first aperture and a second aperture that are adjacent to each other, a distance between an edge of the first aperture and an edge of the second aperture being in a range of ten percent and forty percent of a distance across the first aperture.

9. The pad element recited in claim 1, wherein the pad element is incorporated into an article of apparel.

10. The pad element recited in claim 1, wherein the pad element is incorporated into one of a mat and a backpack.

11. An article of apparel comprising:
at least one textile element configured to form a structure for receiving a portion of a wearer;
a pad element joined to the textile element, the pad element including:
a base member having a first surface positioned adjacent to the textile element, a second surface located opposite the first surface, and a plurality of separate apertures, each of the apertures defining an edge surface extending from the first surface to the second surface, the apertures being spaced from each other, and the base member being formed from a polymer foam material,
a cover layer secured to the second surface of the base member and extending across portions of the apertures positioned adjacent to the second surface, and
a plurality of beads located within the apertures, the beads being formed from a polymer foam material.

12. The article of apparel recited in claim 11, wherein the textile element is secured to the first surface of the base member and extends across portions of the apertures positioned adjacent to the first surface.

13. The article of apparel recited in claim 12, wherein the beads are located between the textile element and the cover layer.

14. The article of apparel recited in claim 12, wherein edges of the cover layer are joined to the textile element adjacent to sides of the base member.

15. The article of apparel recited in claim 11, further including another cover layer that is:
located between the textile element and the first surface of the base member; and secured to the first surface of the base member and extending across portions of the apertures positioned adjacent to the first surface.

16. The article of apparel recited in claim 15, wherein the beads are located between the cover layer and the another cover layer.

17. The article of apparel recited in claim 11, wherein the apertures have a circular shape.

18. The article of apparel recited in claim 11, wherein the cover layer is formed from a textile material.

19. The article of apparel recited in claim 11, wherein the beads have a substantially spherical shape.

20. The article of apparel recited in claim 11, wherein at least twenty of the beads are located within each of the apertures.

21. A pad element comprising:
a polymer foam member having a first surface, an opposite second surface, and a plurality of spaced and circular apertures, each of the apertures defining an edge surface extending from the first surface to the second surface, each of the first surface and the second surface being substantially planar, and the first surface and the second surface being substantially parallel to each other;
a first textile layer secured to the first surface of the polymer foam member and extending across portions of the apertures positioned adjacent to the first surface;
a second textile layer secured to the second surface of the polymer foam member and extending across portions of the apertures positioned adjacent to the second surface; and
at least twenty substantially spherical polymer foam beads located within each of the apertures and between the first textile layer and the second textile layer.

22. The pad element recited in claim 21, wherein the apertures include a first aperture and a second aperture that are adjacent to each other, a distance between an edge of the first aperture and an edge of the second aperture being in a range of two to ten millimeters.

23. The pad element recited in claim 21, wherein the apertures include a first aperture and a second aperture that are adjacent to each other, a distance between an edge of the first aperture and an edge of the second aperture being in a range of ten percent and forty percent of a distance across the first aperture.

24. The pad element recited in claim 21, wherein the pad element is incorporated into one of an article of apparel, a mat, and a backpack.

* * * * *